US008076564B2

(12) United States Patent
Applewhite

(10) Patent No.: US 8,076,564 B2
(45) Date of Patent: Dec. 13, 2011

(54) SCORING A MUSICAL PERFORMANCE AFTER A PERIOD OF AMBIGUITY

(75) Inventor: Douglas Robert Applewhite, Waltham, MA (US)

(73) Assignee: Harmonix Music Systems, Inc., Cambridge, MA (US)

( * ) Notice: Subject to any disclaimer, the term of this patent is extended or adjusted under 35 U.S.C. 154(b) by 144 days.

(21) Appl. No.: 12/474,899

(22) Filed: May 29, 2009

(65) Prior Publication Data

US 2010/0300269 A1 Dec. 2, 2010

(51) Int. Cl.
*G09B 15/00* (2006.01)
*G09B 15/02* (2006.01)
*G10H 1/00* (2006.01)

(52) U.S. Cl. ......... 84/477 R; 84/470 R; 84/609; 84/610; 84/615

(58) Field of Classification Search ........................ None
See application file for complete search history.

(56) References Cited

U.S. PATENT DOCUMENTS

| | | | |
|---|---|---|---|
| 4,783,812 | A | 11/1988 | Kaneoka |
| 5,194,683 | A | 3/1993 | Tsumura et al. |
| 5,287,789 | A | 2/1994 | Zimmerman |
| 5,395,123 | A | 3/1995 | Kondo |
| 5,631,433 | A | 5/1997 | Iida et al. |
| 5,663,517 | A | 9/1997 | Oppenheim |
| 5,768,396 | A | 6/1998 | Sone |
| 5,804,752 | A | 9/1998 | Sone et al. |
| 5,874,686 | A | 2/1999 | Ghias et al. |
| 5,889,224 | A | 3/1999 | Tanaka |
| 5,906,494 | A | 5/1999 | Ogawa et al. |
| 6,121,531 | A | 9/2000 | Kato |
| 6,166,314 | A | 12/2000 | Weinstock et al. |
| 6,352,432 | B1 | 3/2002 | Tsai et al. |

(Continued)

FOREIGN PATENT DOCUMENTS

| | | |
|---|---|---|
| WO | 2005/113096 | 12/2005 |

(Continued)

OTHER PUBLICATIONS

"Karaoke Revolution," In *Wikipedia Online Encyclopedia*. Wikipedia, Retrieved from the Internet: <URL: http://en.wikipedia.org/wiki/Karaoke_Revolution>, 5 pages (retrieved on Aug. 3, 2010).

(Continued)

*Primary Examiner* — Marlo Fletcher
(74) *Attorney, Agent, or Firm* — Wilmer Cutler Pickering Hale & Dorr LLP.

(57) ABSTRACT

Described are methods, systems, and apparatuses, including computer program products, for scoring a musical performance after a period of ambiguity in a rhythm-action game. This is accomplished by displaying a first target music data and a second target music data where the first target music data's tolerance threshold overlaps with a second target music data's tolerance threshold. When a music performance input data is received, the game platform determines if the music performance input data is within both tolerance thresholds. Then scores are determined, based on a degree of matching between the music performance input data and the first target music data and between the music performance input data and the second target music data. The game platform then assigns the music performance input data to whichever target music data has the higher score when the difference between the first and second scores is greater than a predetermined value.

17 Claims, 20 Drawing Sheets

U.S. PATENT DOCUMENTS 6,437,227 B1 8/2002 Theimer
6,504,089 B1 1/2003 Negishi et al.
6,506,969 B1 1/2003 Baron
6,582,235 B1 6/2003 Tsai et al.
6,725,108 B1 4/2004 Hall
6,838,608 B2 1/2005 Koike
6,856,923 B2 2/2005 Jung
6,930,235 B2 8/2005 Sandborn et al.
6,930,236 B2 8/2005 Jung
6,967,275 B2 11/2005 Ozick
7,022,905 B1 4/2006 Hinman et al.
7,030,307 B2 4/2006 Wedel
7,134,876 B2 11/2006 Hou
7,164,076 B2 1/2007 McHale et al.
7,169,998 B2 1/2007 Kondo et al.
7,174,510 B2 2/2007 Salter
7,189,912 B2 3/2007 Jung
7,199,298 B2 4/2007 Funaki
7,271,329 B2 * 9/2007 Franzblau ........................ 84/609
7,320,643 B1 * 1/2008 Brosius et al. .................. 463/37
7,323,631 B2 1/2008 Miyaki et al.
7,423,213 B2 9/2008 Sitrick
7,453,035 B1 11/2008 Evans et al.
7,459,624 B2 * 12/2008 Schmidt et al. ............. 84/477 R
7,488,886 B2 2/2009 Kemp
7,521,619 B2 * 4/2009 Salter .......................... 84/477 R
7,528,315 B2 5/2009 Goodwin
7,579,543 B2 8/2009 Haruyama et al.
7,589,727 B2 9/2009 Haeker
7,605,322 B2 10/2009 Nakamura
7,612,278 B2 11/2009 Sitrick et al.
7,625,284 B2 * 12/2009 Kay et al. ........................ 463/31
7,649,134 B2 1/2010 Kashioka
7,758,427 B2 7/2010 Egozy
7,772,480 B2 8/2010 Brennan
7,806,759 B2 10/2010 McHale et al.
7,829,777 B2 11/2010 Kyuma et al.
7,838,755 B2 11/2010 Taub et al.
7,893,337 B2 2/2011 Lenz
2002/0169014 A1 11/2002 Egozy et al.
2004/0089139 A1 5/2004 Georges et al.
2004/0093354 A1 5/2004 Xu et al.
2005/0115383 A1 6/2005 Chang
2005/0120868 A1 6/2005 Hinman et al.
2005/0229769 A1 10/2005 Resnikoff
2007/0119292 A1 5/2007 Nakamura
2007/0162497 A1 7/2007 Pauws
2007/0163427 A1 * 7/2007 Rigopulos et al. .............. 84/609
2007/0243915 A1 * 10/2007 Egozy et al. ...................... 463/7
2007/0245881 A1 * 10/2007 Egozy et al. .................... 84/609
2008/0053295 A1 3/2008 Goto et al.
2008/0113797 A1 * 5/2008 Egozy ............................. 463/35
2008/0115657 A1 5/2008 Wakiyama
2008/0184870 A1 8/2008 Toivola
2008/0200224 A1 8/2008 Parks
2008/0202321 A1 8/2008 Goto et al.
2008/0289477 A1 11/2008 Salter
2008/0311969 A1 * 12/2008 Kay et al. .......................... 463/7
2008/0311970 A1 * 12/2008 Kay et al. .......................... 463/7
2009/0038467 A1 2/2009 Brennan
2009/0075711 A1 * 3/2009 Brosius et al. .................... 463/7
2009/0082078 A1 * 3/2009 Schmidt et al. ................... 463/7
2009/0104956 A1 4/2009 Kay et al.
2009/0241758 A1 * 10/2009 Neubacker ...................... 84/609
2009/0258686 A1 * 10/2009 McCauley et al. ................ 463/7
2009/0310027 A1 * 12/2009 Fleming ........................ 348/706
2009/0317783 A1 * 12/2009 Noguchi ................... 434/307 A
2010/0009750 A1 1/2010 Egozy et al.
2010/0029386 A1 2/2010 Pitsch et al.
2010/0041477 A1 2/2010 Kay et al.
2010/0283723 A1 11/2010 Konishi
2010/0300264 A1 12/2010 Foster
2010/0300265 A1 12/2010 Foster et al.
2010/0300266 A1 12/2010 Stoddard et al.
2010/0300267 A1 12/2010 Stoddard et al.
2010/0300268 A1 12/2010 Applewhite et al.
2010/0300270 A1 12/2010 Applewhite et al.
2010/0304810 A1 12/2010 Stoddard
2010/0304811 A1 12/2010 Schmidt et al.
2010/0304812 A1 12/2010 Stoddard et al.
2010/0304863 A1 12/2010 Applewhite et al.

FOREIGN PATENT DOCUMENTS

WO 2007/115299 10/2007

OTHER PUBLICATIONS

"Lips," In *Wikipedia Online Encyclopedia*. Wikipedia, Retrieved from the Internet: <URL: http://en.wikipedia.org/wiki/Lips_(video_game)>, 4 pages (retrieved on Aug. 3, 2010).

"SingStar," In *Wikipedia Online Encyclopedia*. Wikipedia, Retrieved from the Internet: <URL: http://en.wikipedia.org/wiki/SingStar>, 10 pages (retrieved on Aug. 3, 2010).

TablEdit Tablature Editor, software having music data display and synthesis functions, Retrieved from the Internet: <URL: http://www.tabledit.com/index.shtml>, 2 pages (retrieved on Mar. 5, 2010).

Non-Final Office Action for U.S. Appl. No. 12/474,800. Mailing date: Apr. 14, 2010, 47 pages.

Response to Non-Final Office Action to the Non-Final Office Action for U.S. Appl. No. 12/474,800 dated: Oct. 13, 2010, 14 pages.

Non-Final Office Action for U.S. Appl. No. 12/474,751. Mailing date: Mar. 12, 2010, 16 pages.

Response to Non-Final Office Action to the Non-Final Office Action for U.S. Appl. No. 12/474,751 dated: Sep. 10, 2010, 4 pages.

Non-Final Office Action for U.S. Appl. No. 12/474,948. Mailing date: Jul. 8, 2010, 14 pages.

* cited by examiner

SCORING A MUSICAL PERFORMANCE AFTER A PERIOD OF AMBIGUITY

FIELD OF THE INVENTION

The present invention relates to video games, and, more specifically, rhythm-action games which simulate the experience of playing in a band.

BACKGROUND

Music making is often a collaborative effort among many musicians who interact with each other. One form of musical interaction may be provided by a video game genre known as "rhythm-action," which involves a player performing phrases from an assigned, prerecorded musical composition using a video game's input device to simulate a musical performance. If the player performs a sufficient percentage of the notes or cues displayed for the assigned part, the singer may score well for that part and win the game. If the player fails to perform a sufficient percentage, the singer may score poorly and lose the game. Two or more players may compete against each other, such as by each one attempting to play back different, parallel musical phrases from the same song simultaneously, by playing alternating musical phrases from a song, or by playing similar phrases simultaneously. The player who plays the highest percentage of notes correctly may achieve the highest score and win.

Two or more players may also play with each other cooperatively. In this mode, players may work together to play a song, such as by playing different parts of a song, either on similar or dissimilar instruments. One example of a rhythm-action game with different instruments is the ROCK BAND® series of games, developed by Harmonix Music Systems, Inc. and published by Electronic Arts, Inc. and MTV Games. ROCK BAND® simulates a band experience by allowing players to play a rhythm-action game using various simulated instruments, e.g., a simulated guitar, a simulated bass guitar, a simulated drum set, or by singing into a microphone. Other examples of rhythm-action games, focused specifically on singing or vocal performances are the KARAOKE REVOLUTION® series of games published by Konami Digital Entertainment, the SINGSTAR® series published by SONY Computer Entertainment, and LIPS™ published by Microsoft Corporation. An example of a prior art systems and methods for comparing a received vocal input's pitch and timing to a particular vocal track pitch is U.S. Pat. No. 7,164,076 to McHale et al.

Prior rhythm-action games directed to vocal performance typically allow one or more players to sing the main vocal part of a song, i.e., the vocal melody. Often the interfaces of these games are similar to traditional karaoke interfaces in that the lyrics appear as words on a display in a sequence and some indication is given to the player which lyrics should be sung when. For example, in Microsoft's LIPS™ game, a lyrical phrase is displayed in white text in the center of the screen and when a word is supposed to be sung, that word's text changes color from white to yellow. Naturally, at the end of the phrase, the text of the entire phrase is yellow. While the current phrase is being performed, the next phrase is displayed in grey text below the current phrase and at the end of the current phrase, the new phrase is shifted up and the text is changed from grey to white.

Beyond what is offered by traditional karaoke systems, many vocal-oriented rhythm-action games also indicate to the player the pitch the player is expected to sing. In LIPS™, a series of stationary hollow horizontal cues or "note tubes" are arranged vertically according to the pitch to person is expected to sing; higher notes are displayed as tubes located higher on the display than tubes representing lower notes. The length of a note tube generally indicates the duration of the lyrics or syllable, and the tubes fill in with color only when the player is singing on key. When the next phrase is to be sung, the prior set of tubes disappears and the next set of tubes is displayed.

In SINGSTAR®, a similar pitch-relative stationary tube system is used—that is hollow tubes show what the player is expected to sing—but the input from the player also paints tubes on the screen reflecting the player's pitch. This has the effect of filling in the hollow tubes when the player is on key and coloring in areas above and below the tube when the player's voice is sharp or flat, respectively, to the expected pitch.

KARAOKE REVOLUTION® presents pitch differently that LIPS™ or SINGSTAR®. In KARAOKE REVOLUTION®, a lane is displayed to the player with a note tubes within it that scroll from right to left with lyrics that scroll under the corresponding note tubes. Both the lyrics and note tubes pass through the vertical plane of a target marker, or "Now Bar," that indicates when the lyric is supposed to be sung and at what pitch. Additionally, an arrow-shaped pitch indicator moves vertically within the lane with respect to the note tube to indicate how sharp or flat the player's voice is compared to the expected pitch represented by the note tube and aligns with the note tube and gives off "sparks" when the player is on key. Unfortunately, the display method used in KARAOKE REVOLUTION® is incompatible with certain displays and causes the lyrics of a song to "tear" and blur, thereby interfering with the player's enjoyment of the game.

Another problem with prior rhythm-action games is the handling of multiple singers. Often only one player is allowed to provide the vocals for a group. Where multiple players can sing, even as a group, players' performances are isolated with respect to each other—that is for each player a separate lane is presented on the display. This is true even when both players are singing the exact same part. Furthermore, though these existing rhythm-action games provide a single user with the ability to sing as part of a band, or sing the same vocal parts as another player, i.e., both players sing the melody as a duet or to sing as lead and backup vocals, none allow players to dynamically switch which vocal part the player is singing. In existing rhythm-action games where players can sing simultaneously, players are locked into a particular part. For example, in KARAOKE REVOLUTION® PRESENTS AMERICAN IDOL® ENCORE, during a "True Duet" where two players sing simultaneously, before the song starts, one player must choose to sing "lead vocals" while the second player chooses "backup." Once gameplay begins, each player is required to sing only the assigned phrases for the part they initially selected, and are penalized as "missing" his or her assigned part if they sing the part assigned to the other player. These part assignments remain until the end of gameplay, thus preventing player from experimenting with different parts unless they physically exchange microphones. The present invention overcomes these deficiencies in several ways.

SUMMARY OF THE INVENTION

The present invention, implemented in various ways such as computerized methods executed by a game platform, executable instructions tangibly embodied in a computer readable storage medium, systems with an apparatus configured to perform particular functions, apparatuses with means for performing the functions, and other forms of technology, provides players of a rhythm-action game a playing experience that more closely resembles that of a cooperative band. This is achieved through several aspects of the invention.

In one aspect, there are methods, systems with an apparatus configured to perform particular functions, computer program products, and apparatuses that provide means for dynamically determining a musical part performed by a player of a rhythm-action game. In one aspect of a rhythm-action game, microphones are not tied to a particular part and therefore any player can play any of a number of parts, e.g., melody or harmony, lead or rhythm, guitar or bass, without switching instruments. This is accomplished by displaying, on a display, a plurality of target music data associated with a musical composition, receiving a music performance input data via the input device, determining which of the plurality of target music data has a degree of matching with the music performance input data, and assigning the music performance input data to the determined target music data.

Beneficially, there are various embodiments of the methods, systems, computer program products, and apparatuses of the aspect. For example, in some embodiments, a score is generated by the game platform based on the degree of matching between the music performance input data and the target music data. In some embodiments, determining the degree of matching is based on a score assigned to the music performance input data with respect to the target music data. In other embodiments, determining the degree of matching is based on the music performance input data being within a tolerance threshold of the target music data. In still other embodiments, determining the degree of matching is based on the proximity of a visual representation of the music performance input data to a visual cue associated with the target music data. Determining the degree of matching can also take other factors into account. For example, determining the degree of matching can include ignoring an octave difference between the music performance input data and the target music data. This is accomplished, in some versions, by determining a first number, e.g., such as a MIDI number corresponding to the input (but the invention is not limited to MIDI), and determining a second number, such as the MIDI number corresponding the target music data, i.e., to the expected input. Then, a modulo operation is performed on the first and second numbers to determine a difference between the music performance data and the target music data. In some implementations, the modulo operation involves determining an above-number based on the first number that is within an octave above the second number. Then an above-difference between the above-number and the second number is determined. A below-number based on the first number that is within an octave below the second number is also determined, as is a below-difference between the below-number and the second number. Finally the minimum of the above-difference and the below-difference is determined to provide the minimal pitch difference between the input and the expected input.

In some implementations, it is determined if the music performance input data is within a tolerance threshold of each of at least two target music data of the plurality of target music data. In these scenarios, alternative approaches to determining the degree of matching are provided based on the tolerance threshold. For example, determining the degree of matching may include assigning a score to each of the at least two target music data. Alternatively or additionally, determining the degree of matching can be based on determining that the music performance input data is no longer within the tolerance threshold of one of the at least two target music data.

An alternate embodiment instead displays a plurality of target music data associated with a musical composition on the display, similarly receives a music performance input data via an input device, but bases the degree of matching solely on determining that the music performance input data is within a tolerance threshold of one of the plurality of target music data. If it is, the music performance input data is assigned to the determined target music data.

Various implementations allow for input from various sources and display target music data accordingly. For example, in some versions, determined target music data is a vocal part of the musical composition. Or, alternatively, the determined target music data can be an instrumental part of the musical composition, such as a guitar part, a keyboard part, a drum part, or a bass guitar part of the musical composition. The sources for each input often correspond to the parts, e.g., for vocal parts, the input device is a microphone. Where the part is a guitar part, a simulated guitar is used and so forth.

With dynamic part determination, often the music performance input data is assigned to only one of the plurality of target music data at a time. Similarly, each of the plurality of target music data can have only one music performance input data assigned to it at a time. For example, while the music performance input data is assigned to the determined target music data, a second music performance input data would be prevented from being assigned to the determined target music data.

To prevent random assignments where the degree of matching is low with all target music data, one implementation involves displaying, on a display, a plurality of target music data associated with a musical composition. A music performance input data is received via an input device such as a microphone, and it is determined that none of the plurality of target music data has a degree of matching with the music performance input data. In this scenario, assignment of the music performance input data to any of the plurality of target music data is prevented until the music performance input data has a degree of matching with one of the plurality of target music data.

In another aspect, there are methods, systems with an apparatus configured to perform particular functions, computer program products, and apparatuses that provide means for biasing a musical performance input of a player of a rhythm-action game to a part in the game. In one aspect this is accomplished by providing, by a game platform, a history of a degree of matching between a prior music performance input data and a prior music data associated with a first part in a musical composition. Then, on a display, a plurality of target music data, each associated with a respective part in the musical composition, is displayed, with one of the plurality being associated with the first part. Music performance input data is received by the game platform via an input device, such as a microphone (although it could be a simulated guitar, drum, keyboard, or other simulated instrument), and, based on the history, the received music performance input is assigned to the target music data of the plurality that is associated with the first part.

Some implementations of the above methods, systems, computer program products, and apparatuses for biasing a musical performance input of a player of a rhythm-action game to a part in the game provide additional or alternative functionality. For example, in some versions, it is further determined that the music performance input data is within a tolerance threshold of each of at least two target music data of the plurality of target music data. Also, in some versions, the received music performance input data is compared to each of the plurality of target music data and a score is assigned to each comparison, e.g., one part that the music performance data was not close to may have a low score whereas a different part that the music performance input data was close to may have a high score.

Several methodologies are provided for determining the history of the degree of matching. For example, in some versions, the history of the degree of matching is determined based on a score assigned to the prior music performance input data with respect to the prior music data. Alternatively or additionally, the history of the degree of matching can be determined based on if the prior music performance input data is within a tolerance threshold of the prior music data, or within a tolerance threshold that overlaps with a second tolerance threshold. Or, in some cases, the history of the degree of matching is determined based on the proximity of a visual representation of the prior music performance input data to a visual cue associated with the prior music data. In still other cases, the history is based on silence—that is, the history of the degree of matching is based on the prior music performance input data being silence when the prior music data indicated no music performance input data should be received.

The history of the degree of matching is typically stored in memory, such as a memory buffer, and often multiple memory buffers are used, one for each part or target music data. Often the information is stored for a limited time, such as ten seconds, but alternatively it can be stored song to song or gaming session to gaming session, e.g., a particular player always tries to sing the melody.

In another aspect, there are methods, systems with an apparatus configured to perform particular functions, computer program products, and apparatuses that provide means for scoring a musical performance after a period of ambiguity in a rhythm-action game. In one aspect this is accomplished by displaying, on a display in communication with a game platform, a first target music data and a second target music data associated with a musical composition. The first target music data has a tolerance threshold that overlaps with a tolerance threshold of the second target music data. Then, a music performance input data is received via an input device, also in communication with the game platform. The game platform determines that the music performance input data is within the first target music data tolerance threshold and within the second target music data tolerance threshold. When this occurs, the game platform determines a first score based on a first degree of matching between the music performance input and the first target music data and determines a second score based on a second degree of matching between the music performance input and the second target music data. The game platform then assigns the music performance input data to the first target music data or the second target music data, often to whichever has the higher score, when the difference between the first score and second score is greater than a predetermined value.

Advantageously, some implementations of the above methods, systems, computer program products, and apparatuses for scoring a musical performance after a period of ambiguity in a rhythm-action game provide additional or alternative functionality. For example, in some implementations, the music performance input data is assigned to the part associated with the higher score. Also, in some versions, the first and second degrees of matching are determined by comparing a pitch component of the music performance input data to a pitch component of the respective first and second target music data.

In some embodiments, when the score that will be assigned is ambiguous, one of the scores, e.g., the first score, is displayed on the display. Once the assigned score is known, the assigned score, if it is not the first score, is displayed, and the first score ceases to be displayed.

In some versions of the above methods, systems, computer program products, and apparatuses, displays, on the display, at least a first target music data and a second target music data associated with a musical composition, the first target music data having a tolerance threshold that overlaps a tolerance threshold of the second target music data. A music performance input data is received via the input device such as a microphone, etc, and it is determined that the music performance input data is within the first target music data tolerance threshold and also within the second target music data tolerance threshold. Then, the music performance input data is assigned to the first target music data when the first target music data tolerance threshold and the second target music data tolerance threshold no longer overlap. In these scenarios, a score, based on a degree of matching between the music performance input data and the first target music data, is also typically assigned to the music performance input data.

In another aspect, there are methods, systems with an apparatus configured to perform particular functions, computer program products, and apparatuses that provide means for scoring a musical performance involving multiple parts in a rhythm-action game. In one aspect this is accomplished by displaying, on a display in signal communication with a game platform, target musical data associated with a musical composition. The game platform receives a first music performance input data, with the first music performance input data being associated with a first part in the musical composition. The game platform also receives a second music performance input data, the second music performance input data associated with a second part in the musical composition. The game platform then calculates a first score based on the first music performance input data and a second score based on the second music performance input data. It then calculates a final or modified score based on the first score and the second score.

Some of the above methods, systems, computer program products, and apparatuses for scoring a musical performance involving multiple parts in a rhythm-action game provide additional or alternative functionality. For example, in some versions, selecting the first score involves determining that the first score is higher than the second score. Alternatively, selecting the first score can involve determining that the first score has priority in being selected over the second score. With respect to modifying the score, in some implementations, modifying the preferred score includes increasing the preferred score by a percentage of the second score. Alternatively or additionally, modifying the preferred score can be based on a third score calculated based on a degree of matching between a third music performance input data and a third part. Additionally, the first and second parts can be associated with a musical player and a final score is assigned that is the modified preferred score to the musical player.

Because microphones or instruments are not tied to parts, in some cases, the first music performance input data and the second music performance input data are received by the game platform from the same input device. In other cases, the first music performance input data and the second music performance input data are received by the game platform from different input devices. Also, the first score can be associated with a melody of the musical composition and the second score is associated with a harmony of the musical composition, or vice versa.

In another aspect, there are methods, systems with an apparatus configured to perform particular functions, computer program products, and apparatuses that provide means for dynamically displaying a pitch range in a rhythm-action game. In one aspect this is accomplished by a game platform dividing a musical composition into a plurality of portions each comprising one or more notes. The musical composition can be divided into portions based on verses, phrases, a length of time, at least a predetermined number of musical notes, or a combination thereof. Then the game platform determines a pitch range between a highest note and a lowest note for each portion. Then the game platform determines a display density for each portion based on the pitch range of each portion, or alternatively, a display density for the entire song based on the greatest pitch range of all portions. Then, the game platform displays each portion within a viewable area. The viewable area has a density that is alterable based on the portion to be displayed or a position that is alterable based on the portion to be displayed, or has both an alterable position and alterable pitch density.

In some versions of the above methods, systems, computer program products, and apparatuses for dynamically displaying a pitch range in a rhythm-action game, the center of the viewable area's position is substantially equidistant between the lowest note and highest note of the portion. Beneficially, the position of the viewable area can be altered before displaying a new portion such that the viewable area appears to slide from the prior position to a position where the center of the viewable area is substantially equidistant between the high note of the new portion and the low note of the new portion. Alternatively, position of the viewable area can be altered before displaying a new portion such that the viewable area appears to slide from the prior position to a position where the viewable area displays the highest note of the new portion and the lowest note of the new portion.

For implementations with variable densities, the above implementations sometimes also include altering the density of the viewable area before displaying a new portion such that the viewable area appears to zoom in before displaying the new portion. Or, in the alternative, altering the density of the viewable area before displaying a new portion such that the viewable area appears to zoom out before displaying the new portion.

In another aspect, there are methods, systems with an apparatus configured to perform particular functions, computer program products, and apparatuses that provide means for preventing an unintentional deploy of a bonus in a video game. In one aspect this is accomplished by displaying, on a display in communication with a game platform, a target music data of a musical composition. The game platform receives a music performance input data via the microphone, and also determines if the music performance input data has a predetermined degree of matching with a vocal cue. If so, the performance input data is prevented from executing an improvisation deploy.

In some versions of the above methods, systems, computer program products, and apparatuses for preventing an unintentional deploy of a bonus in a video game, it is further determined that an improvisation deploy value exceeds a predetermined threshold. In some of the embodiments, it is determined that the music performance input data is at least a predetermined volume for a predetermined duration. In some implementations though, the music performance input data may satisfy the predetermined volume for a predetermined duration, but yet not count towards a threshold input that executes the improvisation deploy because the music performance input has a degree of matching with the target music data. Some embodiments further involve, receiving a second music performance input data via a second microphone; and executing the improvisation deploy if the second music performance input data does not have a predetermined degree of matching with the first target music data.

Alternatively, there are implementations that display, on the display, a first target music data of a musical composition and receive a first performance input data via the microphone. Then, the implementation determines if the first performance input data has a predetermined degree of matching with the first vocal cue, and prevents the first performance input from executing an improvisation deploy if the first performance input is within a tolerance threshold of the first target music data.

In any of the scenarios above involving preventing an unintentional deploy of a bonus in a video game, the first target music data can be a melody target music data or part and the second target music data is a harmony target music data or part. Alternatively, the first target music data can be a harmony target music data or part and the second target music data can be a melody target music data or part. Furthermore, some versions determine if the first performance input is associated with the first vocal cue by determining if a pitch component of the first performance input has a degree of matching with the first vocal cue. Some versions, however, determine if the first performance input is associated with the first vocal cue by determining if the first input matches the first vocal cue within a tolerance threshold of the first vocal cue.

In another aspect, there are methods, systems with an apparatus configured to perform particular functions, computer program products, and apparatuses that provide means for displaying song lyrics and vocal cues in a rhythm-action game. In one aspect this is accomplished by displaying, on a display in communication with a game platform, a vocal cue. The vocal cue moves on the display in synchronization with a timing component of a musical composition towards a target marker. Lyrics are also displayed, but instead of moving with the movement of the vocal cue the lyrics are displayed in a fixed position. The lyrics maintain their position until the vocal cue has moved to a particular position with respect to the target marker.

In some versions of the above methods, systems, computer program products, and apparatuses for displaying song lyrics and vocal cues in a rhythm-action game, the particular position is the first vocal cue is aligned with a vertical plane of the target marker. Moving, in some versions, includes altering the horizontal position of the vocal cue from the right side of the display, through a vertical plane of the target marker, to the right of the display. The particular position that the vocal cues moves to, which is what triggers the release of the lyric from the fixed position, in some cases is the to the left of the vertical plane of the target marker or directly on top of it. Additionally, some implementations further involve displaying a second vocal cue associated with the first vocal cue, the second vocal cue moving through a plane of the target marker; and displaying, on the display, a second lyric.

In any of the above examples for displaying song lyrics and vocal cues in a rhythm-action game, the coloration of the lyric can be altered depending on the position of the vocal cue. For example, the lyric can be highlighted if the vocal cue is aligned with a vertical plane of the target marker, or de-highlighted if the vocal cue is past the vertical plane of the target marker, or appear deactivated before the vocal cue reaches the target marker (i.e., the vocal cue is located to the right of the target marker).

In another aspect, there are methods, systems with an apparatus configured to perform particular functions, computer program products, and apparatuses that provide means, for providing a practice mode for multiple musical parts in a rhythm-action game. In one aspect this is accomplished by displaying, on a display in communication with a game platform, a first and second target musical data associated with a musical composition. The game platform receives a selection by the user of the first target musical data to be performed and produces an audio output associated with the first and second target musical data. The game platform also produces a synthesized tone associated with the first target musical data. In some versions, the target music data that is not selected is dimmed and made less visible.

The implementations above of the practice mode may also include receiving music performance input data and scoring the music performance input data with respect to only the first target musical data. Additionally, some embodiments of the practice mode produce synthesized tone at a volume louder than the audio associated with the first and second target musical data. The first target musical data can be the melody and the second target music data can be the harmony or vice versa.

In another aspect, there are methods, systems with an apparatus configured to perform particular functions, computer program products, and apparatuses that provide means for selectively displaying song lyrics in a rhythm-action game. In one aspect this is accomplished by determining a number of vocal cues to be displayed on a display in communication with a game platform, where the vocal cues are each associated with a lyric. Provided a number of areas available to display a set of lyrics, either before run-time or determined at run-time, the game platform determines, based on a lyric priority associated with each lyric, which of the lyrics associated with each vocal cue to display when the number of vocal cues exceeds the number of areas available.

The methods, systems, computer program products, and apparatuses for selectively displaying song lyrics include also allow for variations. For example, in some versions, one of the vocal cues and an associated lyric are associated with a lead vocal part in a musical composition. Alternatively, the vocal cues can be a plurality of the vocal cues, and the plurality and their corresponding lyrics are associated with a plurality of harmony vocal parts in the musical composition. In some embodiments, the lyric priority of each of the plurality of lyrics is predetermined. In other embodiments, the lyric priority of each of the plurality of lyrics is assigned randomly. In some implementations, the number of areas available to display the set of lyrics is predetermined before execution of the computerized method. In other implementations, the number of areas available to display the set of lyrics is determined at rum-time.

In another aspect, there are methods, systems with an apparatus configured to perform particular functions, computer program products, and apparatuses that provide means for displaying an input at multiple octaves in a rhythm-action game. In one aspect this is accomplished by receiving by a game platform via a microphone, a music performance input data and displaying, on a display in communication with the game platform, a first pitch marker reflective of the music performance input data. Then substantially simultaneously with the display of the first pitch marker, displaying a second pitch marker at an offset, typically vertical, from the first pitch marker, the offset indicative of an octave difference between the first pitch marker and the second pitch marker. In some versions, the second pitch marker is indicative of an octave above the first pitch marker; in others the second pitch marker is indicative of an octave below the first pitch marker. As above, a vocal cue is displayed that includes a pitch component. Then a first score is calculated for the first pitch marker based on a comparison between the first pitch marker and the pitch component of the vocal cue and a second score is calculated for the second pitch marker based on a comparison between the second pitch marker and the pitch component of the vocal cue. In some implementations, the second pitch marker is displayed only if the music performance input data has a degree of matching with a target music data when the octave of the music performance input data is not used to determine the degree of matching. In some of these implementations, the degree of matching is based on a tolerance threshold.

In another aspect, there are methods, systems with an apparatus configured to perform particular functions, computer program products, and apparatuses that provide means for displaying a harmonically relevant pitch guide in a rhythm-action game. In one aspect this is accomplished by analyzing, by a game platform, target music data associated with a musical composition to determine a musical scale within the target music data. Then a bounded space, such as a lane to display vocal cues in, is displayed that includes a plurality of interval demarcations based on the scale, and a background comprising a color scheme based on preselected pitches of the scale. Then the game platform displays the target music data in a manner indicative of the harmonically relevant pitches with respect to the pitch guide.

In some versions of the above methods, systems, computer program products, and apparatuses for displaying a harmonically relevant pitch guide, the preselected pitches are harmonically relevant. Specifically, in some embodiments, the preselected pitches of the scale are the root, 3rd, and fifth pitches of the scale. In some implementations, an uppermost pitch and a lowermost pitch of the target music data is determined. Then the lane's upper bound is based on the uppermost pitch of the target music data and its lower bound based on the lowermost pitch of the target music data. Additionally or alternatively, the color scheme can include a first color for intervals not matching the preselected pitches and a second color for intervals that do match the preselected pitches, or the color scheme can include shading the background according to the preselected pitches, such as being shaded with a first color for harmonically relevant pitches and shaded a second color for pitches that are not harmonically relevant.

Advantageously, for any of the aspects above, a pitch arrow can be associated with the music performance input data to indicate how the player is performing. Specifically, the pitch arrow points up if the music performance input data is flat compared to the assigned target music data and the pitch arrow points down if the music performance input data is sharp compared to the assigned target music data. Alternatively or additionally, the pitch arrow points towards the assigned target music data and the arrow is positioned above the target music data if the music performance input data is sharp compared to the assigned target music data or the arrow is positioned below the target music data if the music performance input data is flat compared to the assigned target music data.

Beneficially, in some implementations where a music performance input is assigned to a part, target music data, or is scored, doing so may alter a visual property of the part, the target music data associated with the part, the arrow associated with the music performance input, or any of these. For example, the target music data (part, arrow, etc.) may glow or flash. Alternatively assignment or scoring may alter an audio property of the game such as causing a crowd to cheer or to make the received performance input data or audio associated with the target music data become louder or have a distortion effect applied to it.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DETAILED DESCRIPTION

Architecture

Figure 1A:
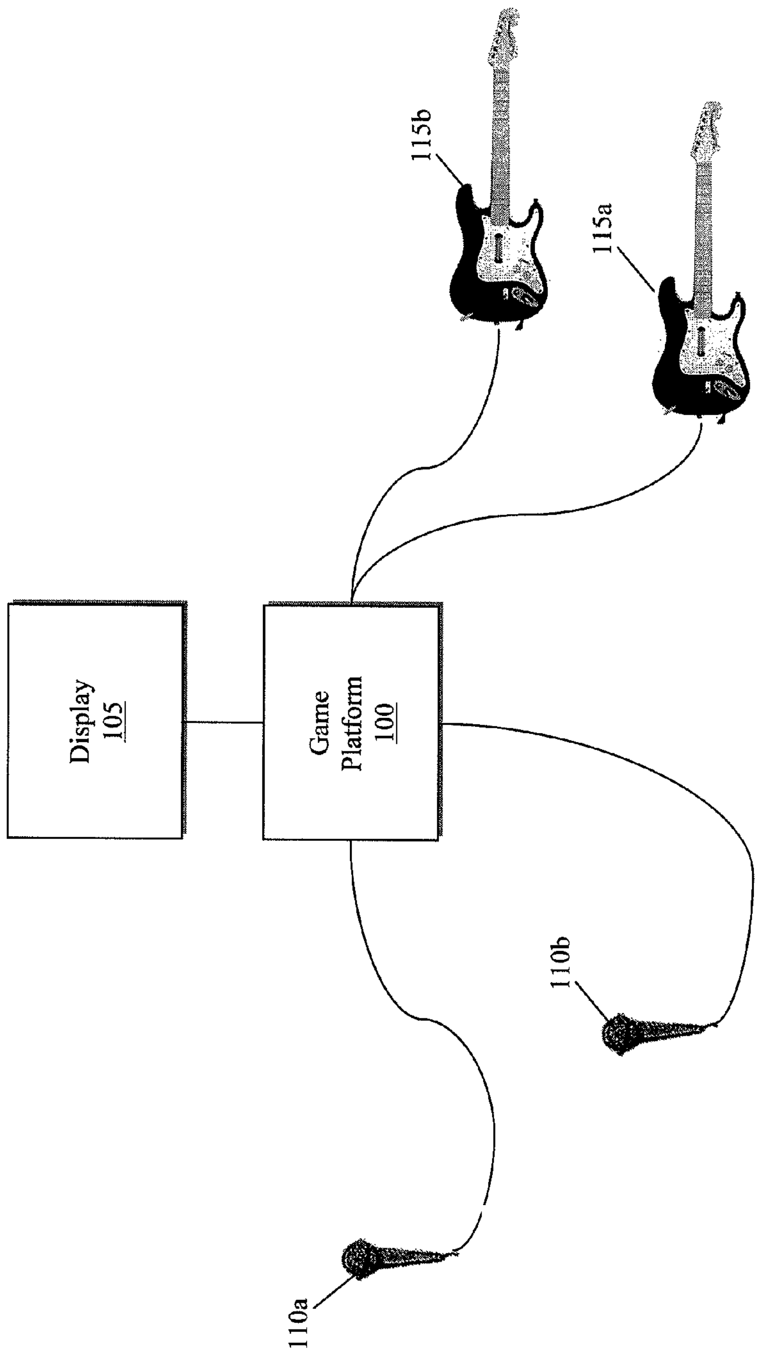
FIG. 1A is a diagram depicting a game platform and various components in signal and/or electrical communication with the game platform.

FIG. 1A is a diagram depicting a game platform 100 for running game software and various components in signal communication with the game platform. Each player may use a game platform 100 in order to participate in the game. In one embodiment, the game platform 100 is a dedicated game console, such as: PLAYSTATION® 2, PLAYSTATION® 3, or PSP® manufactured by Sony Corporation; WII™, NINTENDO DS®, NINTENDO DSi™, or NINTENDO DS LITE™ manufactured by Nintendo Corp.; or XBOX® or XBOX 360® manufactured by Microsoft Corp. In other embodiments, the game platform 100 comprises a personal computer, personal digital assistant, or cellular telephone. Throughout the specification and claims, where reference is made to "the game platform 100" performing a function, "game platform 100" may, for some implementations, be read as "game platform 100 with game software executing on it." References to the game platform 100 and omission of reference to the game software does not imply absence of the game software. Game software alone may also embody the invention, e.g., a computer program product, tangibly embodied in a computer-readable storage medium, while in some embodiments the invention is implemented purely in hardware such as a computer processor configured to perform specific functions. In other embodiments the invention is embodied by a combination of hardware and software.

The game platform 100 is typically in electrical and/or signal communication with a display 105. This may be a television, an LCD monitor, projector, or the like. The game platform is also typically in electrical or signal communication with one or more controllers or input devices. In FIG. 1, the game platform 100 is in signal communication with a first microphone 110*a*, a second microphone 110*b* (microphones, collectively, 110), a first simulated guitar controller 115*a* and a second simulated guitar controller 115*b* (guitar controllers, collectively, 115). Other inputs can be other simulated instruments such as keyboards and drums (not shown), standard controllers for the respective game platforms, and/or keyboards and/or mice (also not shown). Microphones, controllers, etc. may be connected via a physical wire, e.g., via a USB connection, or may be connected wirelessly, e.g., via Bluetooth, FM, a proprietary wireless protocol used by the Microsoft Xbox 360 game console, or other wireless signaling protocols.

Figure 1B:
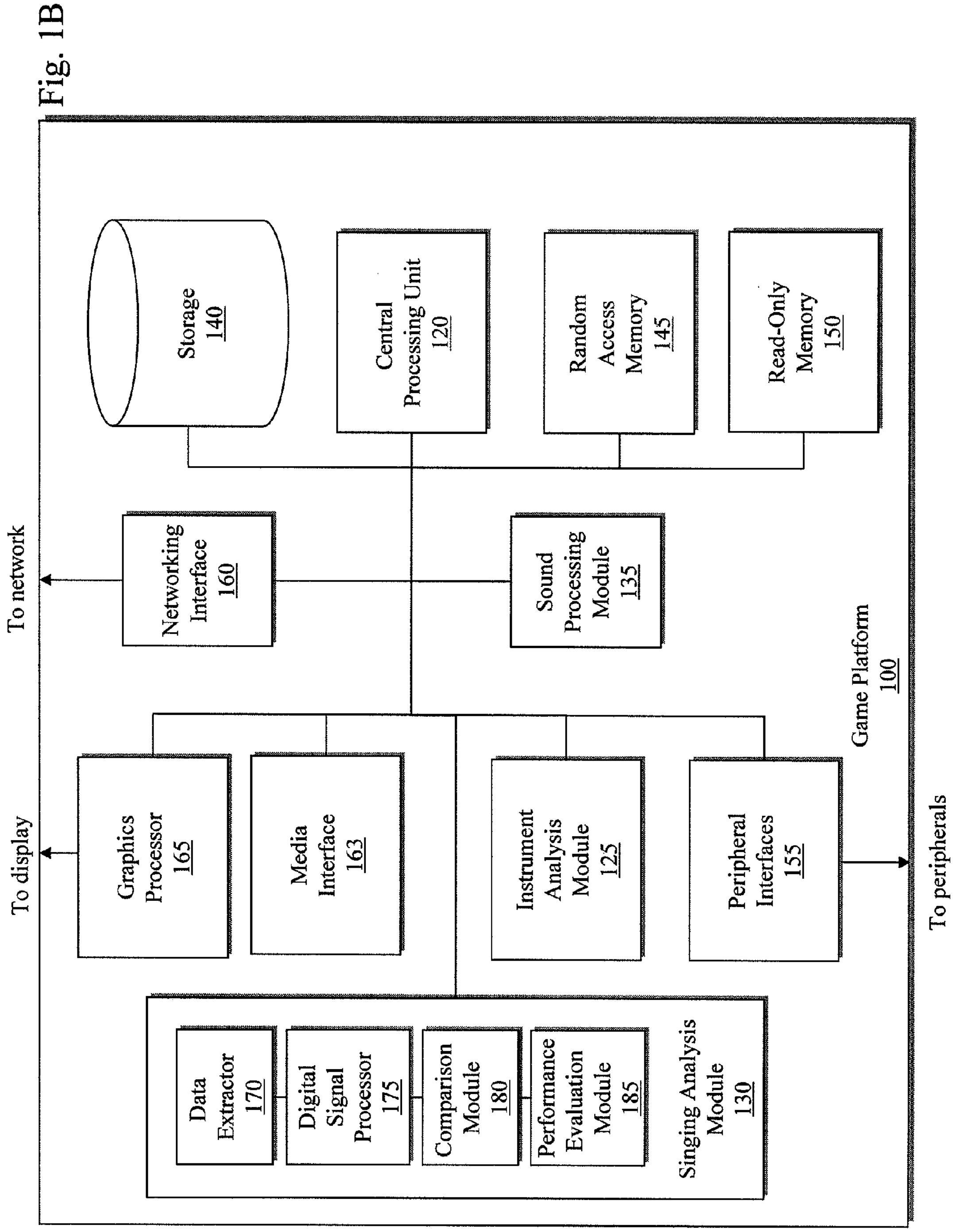
FIG. 1B is a diagram depicting various components and modules of a game platform.

Though reference is made to the game platform 100 generally, the game platform, in some embodiments such as that depicted in FIG. 1B, contains hardware and/or software that perform general or specific tasks, such as a central processing unit 120, an instrument analysis module 125, a singing analysis module 130, a sound processing module 135 that provides sound output, e.g., to a speaker, a storage device 140, Random Access Memory 145, Read Only Memory 150, peripheral interfaces 155, networking interface 160, media interfaces 163 (e.g., a CD-ROM, DVD, or Blu-Ray drive or SD, Compact Flash, or other memory format interfaces), graphic processors 165 and others. Each module may also contain sub-modules. For example the singing analysis module 130 may contain a data extractor module 170, a digital signal processor module 175, a comparison module 180, and a performance evaluation module 185. Alternatively, in software implementations of the modules, modules or combinations of modules may reside within the RAM 145 or ROM 150 (and/or be loaded into these from media via the media interface 163 or from storage 160) for execution by the central processing unit 120.

Prior art versions of some of these modules are found in U.S. Pat. No. 7,164,076 as they relate to processing vocal input. The data extractor module 170 extracts pitch data and timestamps stored in song data records, which may be stored in storage 140, RAM 145, ROM, 150, on memory card or disc media in communication with the game platform 100, or accessible via a network connection. The digital signal processor module 175 extracts pitch frequency data from the digital data stream using known pitch extraction techniques. In some embodiments, a time-based autocorrelation filter is used to determine the input signal's periodicity. The periodicity is then refined to include a fractional periodicity component. This period is converted into frequency data, which is then converted into a semitone value or index using known conversion techniques. The semitone value may be similar to a MIDI note number, but may have both integer and fractional components (e.g., 50.3). While the pitch data is typically represented by semitones, pitch data can be converted into any desired units (e.g., Hertz) for comparison with the sampled pitch data from a microphone input.

The comparison module 180 compares the timestamps of data records with the sample time associated with the pitch sample. The comparison module 180 selects a data record from a number of data records stored in a buffer that has a timestamp that most closely matches the sample time, then compares the pitch value stored in that data record (i.e., correct pitch) with the pitch sample associated with sample time. In some embodiments, the comparison includes determining the absolute value of the difference between the correct pitch value and the sample pitch data. The performance evaluation module 185 takes the results of the comparison module 180 and generates performance evaluation data based on the pitch error and other settings, e.g., the difficulty chosen by the player. This information includes a tolerance threshold, which can be compared against the pitch error to determine a performance rating. If the pitch error falls within the tolerance threshold, then a "hit" will be recorded, and if the pitch error falls outside the tolerance threshold, then a "miss" will be recorded. The hit/miss information is then used to compute a score and to drive or trigger the various performance feedback mechanisms described herein (e.g., pitch arrow, performance meter, crowd meter, etc.). Though pitch extraction and determining a hit or miss for one part are known, the modules, their functions and programming are improved by the present invention and provide new functionality described herein.

Figure 2:
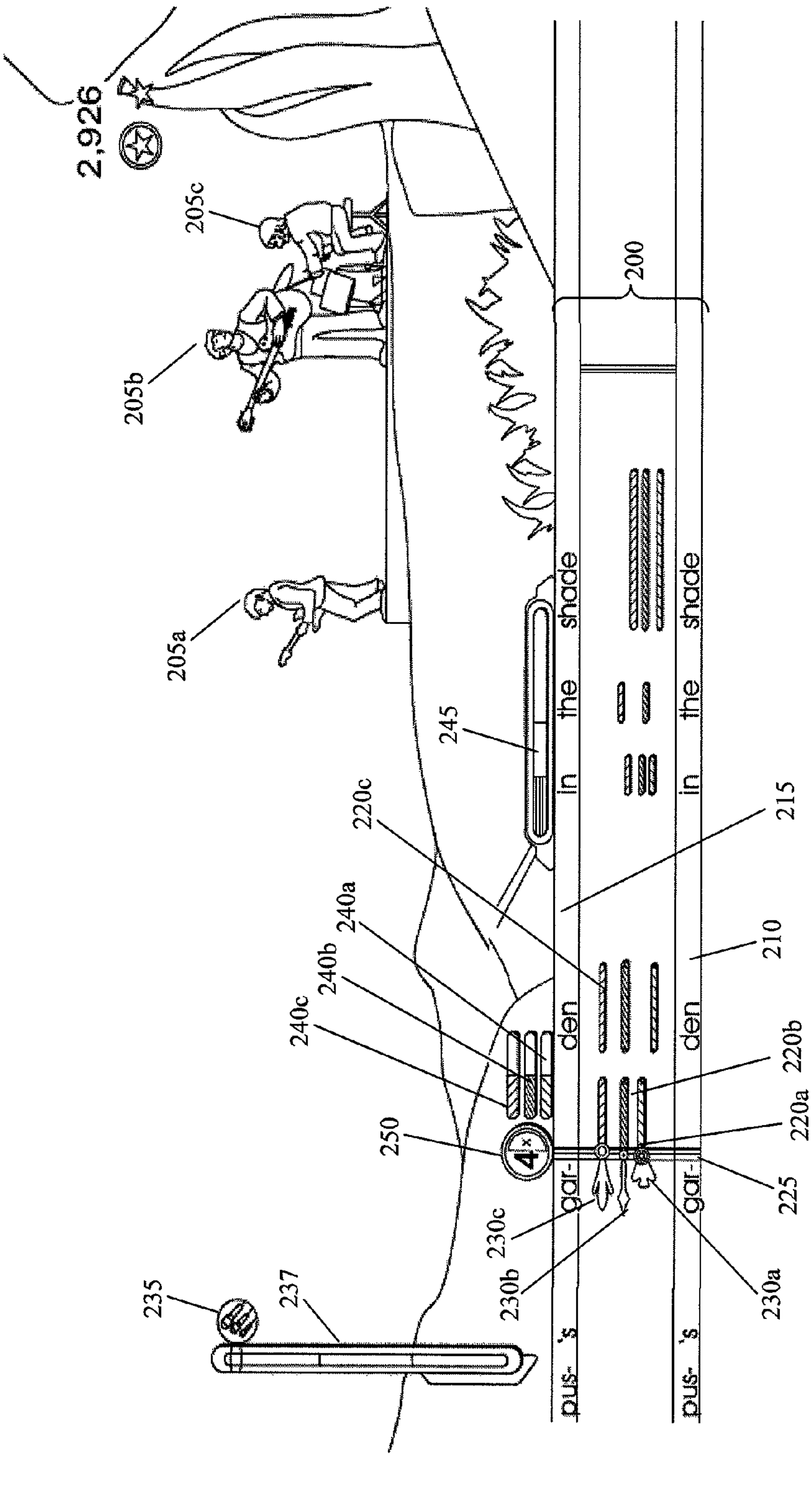
FIG. 2 is an exemplary screenshot of one embodiment of a multiplayer rhythm-action game where multiple vocal parts are displayed and multiple vocal inputs are received.

In some embodiments, execution of game software limits the game platform 100 to a particular purpose, e.g., playing the particular game. In these scenarios, the game platform 100 combined with the software, in effect, becomes a particular machine while the software is executing. In some embodiments, though other tasks may be performed while the software is running, execution of the software still limits the game platform 100 and may negatively impact performance of the other tasks. While the game software is executing, the game platform directs output related to the execution of the game software to the display 105, thereby controlling the operation of the display. The game platform 100 also can receive inputs provided by one or more players, perform operations and calculations on those inputs, and direct the display to depict a representation of the inputs received and other data such as results from the operations and calculations, thereby transforming the input received from the players into a visual representation of the input and/or the visual representation of an effect caused by the player. FIG. 2 provides some examples of data depicted on the display 105.

Game Interface

FIG. 2 is an exemplary screenshot of one embodiment of a multiplayer rhythm-action game where multiple vocal parts are displayed via an input interface 200 and multiple vocal inputs are received. In FIG. 2, the vocal parts depicted represent a lead vocal part and two harmony vocal parts, though whether a part is designated a melody part or a harmony part is not mandated. In some embodiments, no musical distinction is made by the game platform 100 between parts, e.g., no distinction between melody and harmony; instead, the game presents all parts as simply different parts.

While FIG. 2 depicts primarily vocal performances, players can also provide input via instruments 115 and/or game controllers, for example, a player can both sing and play a simulated guitar, keyboard, drums, or other instrument and the input is handled by the respective singing analysis module 130 or instrument analysis module 125. Beneficially, additional players, e.g., fourth and fifth players (or more), may join the game as keyboard players, playing other instruments, and/or provide additional vocal inputs. Input provided via an instrument or microphone is not necessarily tied to a particular human player. For example, in the game there can be one vocal "instrument" or musical "player" that represents vocal input, and correspondingly one avatar representing singing input, but vocal input can actually come from one, two, or any number of microphones connected to the game platform, allowing multiple real-world players to contribute to the one vocal "player" in the game.

One or more of the players of the game may be represented on screen by an avatar 205*a*, 205*b*, 205*c* (collectively 205), rendered by the graphics processor 165. In some embodiments, an avatar 205 may be a computer-generated image. In other embodiments, an avatar 205 may be a digital image, such as a video capture of a person. An avatar 205 may be modeled on a famous figure or, in some embodiments, the avatar may be modeled on the game player associated with the avatar. In cases where additional players enter the game, the screen may be altered to display an additional avatar 205 and/or music interface for each player.

In FIG. 2, an input interface 200 is displayed as a bounded space, i.e., a "lane" is used to display vocal cues and received vocal inputs. The lane 200 has an area for displaying a first set of lyrics 210, an area for displaying a second set of lyrics 215, and an area between the lyrical areas for displaying "vocal cues" 220*a*, 220*b*, 220*c* (collectively 220). During gameplay, the cues 220, also referred to as "musical targets", "target music data" or note tubes, appear to flow toward a target marker 225, also called a Now Bar. Understandably, the Now Bar 225 represents what the player should be inputting at a particular moment, i.e., now. In some embodiments, the cues 220 flow from right to left. In other embodiments it is left to right. In other embodiments, the cues 220 appear to be flowing from the "back" of the screen towards a player as if in a three-dimensional space, on a spatial path that does not lie within the image plane.

The cues 220 are distributed in the lane 200 in a manner having some relationship to musical content associated with the song being audibly played. For example, the cues 220 may represent pitch (cues displayed towards the bottom of the lane represent notes having a lower pitch and cues towards the top of the lane, e.g., 220*c* represent notes having a higher pitch), volume (cues may glow more brightly for louder tones), duration (cues may be "stretched" to represent that a note or tone is sustained), note information (cues spaced more closely together for shorter notes and further apart for longer notes), articulation, timbre or any other time-varying aspects of the musical content. The cues 220 may be tubes, cylinders, circlers, or any geometric shape and may have other visual characteristics, such as transparency, color, or variable brightness.

As the cues 220 move through the lane and intersect the Now Bar 225, the player is expected to sing the musical data represented by the vocal cues. To assist the player, in some embodiments the music data represented by the note tubes

220 may be substantially simultaneously reproduced as audible music or tones. For example, during regular play or during a practice mode, to assist a player with a particular part, the pitch that the player is expected to sing is audibly reproduced, thereby assisting the player by allowing them to hear a pitch to match.

In certain embodiments, successfully performing the musical content triggers or controls the animations of avatars 205. Additionally, the visual appearance of interface elements, e.g., the cues 220, may also be modified based on the player's proficiency with the game. For example, failure to execute a game event properly may cause game interface elements 220 to appear more dimly. Alternatively, successfully executing game events may cause game interface elements 220 to glow more brightly. Similarly, the player's failure to execute game events may cause their associated avatar 205 to appear embarrassed or dejected, while successful performance of game events may cause their associated avatar to appear happy and confident. In other embodiments, successfully executing cues 220 in the lane 200 causes the avatar 205 associated with that performance to appear to sing in a particular manner. For example, where the singer is on key for a sustained period, the avatar 205 may appear to "belt out" the vocal part. In some embodiments, when two or more parts are being successfully sung, e.g., human players are singing the same or different vocal parts and the players are both on key for their respective parts (or the same part), avatars 205 will visually be depicted standing closer together or leaning into each other and singing. In some embodiments the avatars 205 will be depicted sharing a microphone on stage. Successful execution of a number of successive cues 220 may cause the corresponding avatar 205 to execute a "flourish," such as kicking their leg, pumping their fist, winking at the crowd, spinning around, or if the avatar is depicted with an instrument, performing a guitar "windmill," throwing drum sticks, or the like.

Player interaction with a cue 220 may be required in a number of different ways. In one embodiment, there is one vocal "player" for the game, i.e., vocal input from any number of different microphones are represented as one member of the group, or by one avatar 205, even though many real-world players may provide vocal input. For example, in one scenario, a real-world player can choose a microphone 110*a* as their instrument from an instrument selection screen. When gameplay starts, the game platform detects, in some cases via peripheral interfaces 155, that multiple microphones are in electrical and/or signal communication with the game platform (e.g., plugged into the game platform or connected wirelessly). When a vocal cue 220 is displayed to the players, not only can the person that chose the microphone 110*a* at the instrument selection screen sing and provide vocal input, but so can anyone else singing into a microphone 110*b* that is in signal communication with the game platform 100. Any singing input into the other microphones 110*b* provided by real-world players can be treated as coming from the person that chose the microphone 110*a*, as additional input, or as complementary input to the person that chose the microphone 110*a*. In some implementations, additional or complementary input provides a bonus score to the person that selected the microphone. Thus, several real-world people singing can be treated, along with the person that chose microphone, as one "player" or one "instrument" in the game.

Beneficially, no one player singing into a microphone 110 is necessarily tied to a vocal part, e.g., a melody or harmony part. In a multi-vocal part game, e.g., one that allows players to sing melody and harmony parts simultaneously, the player that chose the microphone 110*a* can sing a harmony part while another player that has a microphone 110*b* can sing a melody part, or vice versa, or the two can switch dynamically during gameplay, even during a single phrase. Not tying players to particular parts is applicable to other instruments as well, e.g., guitars 115, and not limited to vocal input. For example, in a game where there are multiple guitar parts, e.g., lead guitar and rhythm guitar, two players each playing a simulated guitar 115*a*, 115*b* can play with one player performing the lead guitar part, the other playing the rhythm guitar part, or vice versa, or they can switch which part they are each playing dynamically during the game, even within a phrase. Similarly, where there are two or more keyboard parts displayed, two or more players with simulated keyboards (not shown) can each play different parts, e.g., parts played on the higher keys on the keyboard, in the middle of the keyboard, or parts involving the lower keys. Additionally or alternatively, combinations of parts can be played by a single player and additional players can play additional parts, e.g., one person plays high and middle key parts and the other plays low parts, or one person could perform high and low while another performs middle parts, or other combinations.

Referring back to vocal input, player interaction with a cue 220 may comprise singing a pitch and or a lyric associated with a cue 220. In one aspect, multiple vocal parts 220*a*, 220*b*, 220*c* are displayed substantially simultaneously in the same lane 200, with different vocal parts depicted using different colors. Additionally or alternatively, pitch indicators 230*a*, 230*b*, 230*c* (collectively 230) assigned to each microphone in communication with the game platform 100 have a particular shape, e.g., triangle, circle, square, or various stylized arrows, or other shapes. In some embodiments the pitch markers assigned to each microphone have a distinctive coloring or shaping allowing players to distinguish between them.

As an example, in FIG. 2, three stylized arrows 230 depict the received input from each of microphone 110*a*, 110*b*, and a third microphone (not shown) in communication with the game platform 100. Though one to three vocal parts are displayed and explained herein, the system and game can process, score, and display any number of vocal parts and/or inputs. For example, a first microphone's 110*a* input is reflected by a spade-shaped marker 230*a*, a second microphone's 110*b* input is represented by an elongated, cross-shaped arrow 230*b*, and the third microphone's input is represented by an arrow resembling a stylized pointer 230*c*. Additionally, each vocal part is displayed using different color. For example, in some implementations, the tubes 220*a* for a lead or main vocal part are displayed in blue, the tubes 220*b* for a first harmony part are displayed in brown, and the tubes 220*c* for a second harmony part are displayed in orange. In FIG. 2, the received pitch input from the first microphone 110*a* matches the pitch of the main vocal tube 220*a*. The received pitch input from the second microphone 110*b* matches the pitch of the first harmony vocal part tube 220*b* and the received pitch input from the third microphone (not shown) matches the pitch of the second harmony part tube 220*c*. Notably, none of the microphones 110, however, are permanently tied to any of the tubes 220 or parts; the input from the microphones 110 can dynamically switch during gameplay depending on various factors such as how closely the input matches a particular tube 220 or if the input from that microphone was successfully singing other tubes from that part, and other factors.

Still referring to FIG. 2, the arrows 230 provide the players with visual feedback regarding the pitch of the note that is currently being sung. If the arrow 230 is above the note tube 220, the arrow 230 points down towards the tube 220 and the player needs to lower the pitch of the note being sung. Similarly, if the arrow 230 is below the note tube, the arrow points up to the tube 220 and the player needs to raise the pitch of the note being sung. However, as discussed herein, because microphones 110 are not forced to a particular vocal part 220, any player can actually be singing any of these parts, e.g., the input represented by 230*a* for the first player could be attempting to sign the first harmony vocal tube 220*b* and the player could just be off key. Beneficially, in some embodiments, all three players can all sing any of the parts together, e.g., all three players can sing the first harmony line, without any risk of failing the game because the other parts are not sung. In some implementations, however, only one input is assigned to any given part and even though three players may be attempting to sing the same part, only one of them gets credit for successfully performing it.

In addition to multiple vocal cues, multiple sets of lyrics can be sung. Still referring to FIG. 2, the first set of lyrics 210, displayed at the bottom of the lane 200 in this embodiment, represents lyrics associated with a first vocal part 220*a*, such as the main or lead vocals in the song. The second set of lyrics 215, displayed at the top of the lane 200 in this embodiment, is associated with a second vocal part 220*b*, such as the harmony vocals. Though the lyrics depicted in FIG. 2 are the same for both parts, depending on the song, the harmony part 220*b* may have lyrics when the main part 220*a* does not and vice versa, or there may be multiple sets of lyrics, e.g., a lead and two sets of harmony lyrics. In some embodiments, there may be more parts (with associated lyrics) than there are display lanes for the lyrics. In the embodiment depicted in FIG. 2, there are three vocal parts, but only a means for displaying two sets of lyrics. In this type of situation, each set of lyrics is assigned a priority value by the game platform. The priority can be assigned by the game manufacturer when making the game, it can be assigned dynamically at runtime, or the game platform 100 can choose randomly. When displaying the lyrics, the game platform 100 determines the priority for each set of lyrics and displays the two sets of lyrics with the highest priority. In cases where two lyrics are assigned the same priority, the game platform 100 may chose one of the lyric sets randomly, or may choose from a preferred order, e.g., if there are two harmony parts, designated harmony part 1 and harmony part 2, and both have the same priority, the game platform 100 may always choose the lyrics for harmony part 1.

Still referring to FIG. 2, an indicator 235 of the performance of the singing players on a single performance meter 237 is shown. Where players are additionally or alternatively performing with instruments, each instrument is represented by an icon. In the figure shown, the multi-microphone icon 235 is a circle with graphics indicating the instrument the icon corresponds to, i.e., a multi-microphone icon is depicted representing the performance of the group singing multiple vocal parts. Where there is only one microphone 110*a* plugged in, or only one player providing vocal input, only one microphone is displayed in the icon 235. When two microphones 110*a*, 110*b* are plugged in, two microphones are depicted in the icon 235, and so forth. The position of a player's icon 235 on the meter 237 indicates a current level of performance for the "player." A colored bar on the meter 237 may indicate the performance of the band as a whole. Although the meter 237 shown displays the performance of one "player," i.e., a multi-mic embodiment with many singing players treated as one player, in other embodiments, any number of players or bands may be displayed on the meter 237, including two, three, four, five, six, seven, eight, nine, or ten players, and any number of bands.

Also in FIG. 2, phrase performance meters 240*a*, 240*b*, 240*c* (collectively 240) are displayed for each vocal part, reflecting how much of the particular vocal part has been completed or sung correctly for that phrase. As note tubes 220 are sung correctly for a particular vocal part, the corresponding phrase performance 240 meter fills up. In some embodiments, multiple players can contribute to filling the phrase meter for a particular vocal part. For example, a first person may sing the main vocal line 220*a* correctly for the first half of the phrase and fill the corresponding phrase performance meter 240*a* halfway. Then, a second player performs the main vocals 220*a* correctly for the second half of the phrase, thereby completely filling the phrase performance meter 240*a* for the main vocals. In some embodiments, two players can simultaneously perform the same part and each contributes to filling the phrase performance meter 240 for that part. For example, the first and second players each sing the main vocal part 220 correctly for the first half of the phrase and neither sings for the second half of the phrase. Because the first player sang correctly for the first half of the phrase, the performance meter 240*a* is filled half way. And because the second player also performed correctly for the first half, i.e., also performed half of the phrase correctly, the rest of the phrase performance meter 240*a* is filled. In other embodiments, even if two players are singing the same part, e.g., 220*a*, the corresponding phrase performance meter 240*a* is filled based on only one of the performances because only one input is counted per part. In other embodiments, the performance of one player, e.g., the first player, is used to fill the meter 240*a* and additional performances, e.g., by the second player, fill the phrase performance meter 240*a* only incrementally. In still other embodiments, if two players are attempting to sing the same part, e.g., melody, and another part's cue, e.g., a harmony part, is close, one player will be assigned to the part both are trying to sing (melody) and the other player will be automatically assigned to the nearby part (harmony).

In some embodiments, a separate performance meter (not shown) may be displayed for each player. This separate performance meter may comprise a simplified indication of how well the player is doing. In one embodiment, the separate performance meter may comprise an icon which indicates whether a player is doing great, well, or poorly. For example, the icon for "great" may comprise a word such as "Fab" being displayed, "good" may be a thumbs up, and "poor" may be a thumbs down. In other embodiments, a player's lane may flash or change color to indicate good or poor performance.

Still referring to FIG. 2, a bonus meter 245 may be displayed indicating an amount of stored bonus. The meter may be displayed graphically in any manner, including a bar, pie, graph, or number. Bonuses may be accumulated in any manner including, without limitation, by playing or singing specially designated musical phrases, hitting a certain number of consecutive notes, or by maintaining a given percentage of correct notes. In some embodiments, players may contribute to a group bonus meter, where each player successfully performing their part adds to the bonus meter.

In some embodiments, if a given amount of bonuses are accumulated, a player may activate the bonus to trigger an in-game effect. An in-game effect may comprise a graphical display change including, without limitation, an increase or change in crowd animation, avatar animation, performance of a special trick by the avatar, lighting change, setting change, or change to the display of the lane of the player. An in-game effect may also comprise an aural effect, an increase in volume, or a crowd cheer, and/or an explosion or other aural signifier that the bonus has been activated. In embodiments where instruments are used, an effect could be a guitar modulation, feedback, distortion, screech, flange, wah-wah, echo, or reverb. An in-game effect may also comprise a score effect, such as a score multiplier or bonus score addition. In some embodiments, the in-game effect may last a predetermined amount of time for a given bonus activation. In some implementations, the singer may trigger or deploy the bonus by providing any manner of vocal input, e.g., percussion sounds such as tapping the microphone, speaking, screaming, wailing, growling, etc. This triggering or deployment is also called an "improvisation deploy."

In some embodiments, bonuses may be accumulated and/or deployed in a continuous manner. In other embodiments, bonuses may be accumulated and/or deployed in a discrete manner. For example, instead of the continuous bar 245 shown in FIG. 2, a bonus meter may comprise a number of "lights" each of which corresponds to a single bonus earned. A player may then deploy the bonuses one at a time. In some embodiments, where a group bonus is accumulated, any of the players may activate or deploy the bonus. In some implementations, there are only certain periods during a musical composition that a bonus can be deployed, such as areas of the song where there are no lyrics or no assigned parts. In other embodiments, e.g., for instrumental parts, the deployable sections may be when the instrument has a solo, such as a drum fill for drum parts or a guitar solo for guitar parts. Alternatively, the bonus can be deployed by tilting or shaking an instrument or microphone. The improvisation deploy may be available at different times per part for a given instrument or microphone. For example, in one embodiment the melody part may prompt the player to sing while a harmony part does not have any vocal cues to present to the player. During the period of silence for the harmony, the bonus may be deployed. Then, for example, in the next bar where the harmony part is supposed to be sung and the melody part is silent, the ability to deploy the bonus may be available for melody part. In some embodiments, if an input is close to a particular note tube or assigned to a part, the input is prevented from activating the bonus to avoid accidentally triggering it by not counting the input towards the input required to deploy a bonus. Typically an area for a player to deploy a bonus is indicated visually by displaying colorful patterns or swirls to the players (see, e.g., 1100 and 1105 of FIG. 11).

FIG. 2 also depicts a score multiplier indicator 250. A score multiplier indicator 250 may comprise any graphical indication of a score multiplier currently in effect for a player, e.g., 4×. In some embodiments, a score multiplier may be raised by correctly singing a particular vocal part or hitting a number of consecutive note tubes. In other embodiments, the score multiplier may be raised by perfectly singing a certain number of phrases in a row, thereby creating a streak of well-sung phrases. In other embodiments, a score multiplier may be calculated by averaging score multipliers achieved by individual members of a band or individual people singing. For example, a score multiplier indicator 250 may comprise a disk that is filled with progressively more pie slices as a player hits a number of notes in a row. Once the player has filled the disk, the player's multiplier may be increased, and the disk may be cleared.

Dynamic Musical Part Determination

One feature of the game is that input received from a simulated instrument, e.g., 115, or microphone, e.g., 110, is not forcibly associated with a particular part for that instrument or microphone for the duration of a song. Specifically, players providing input can dynamically switch between melody and harmony parts, or lead and rhythm parts, different percussion parts where two or more drums are present, or, in the case of simulated guitars, even guitar parts and bass guitar parts, during gameplay. Though examples herein typically refer to microphones, vocal input, and vocal parts, the technology is applicable to guitars, bass guitars, drums, keyboards, and other simulated instruments as well. Furthermore, references to melody and harmony are not limiting; rather, in discussing two or more parts, the game can present any two or more parts to the players, e.g., two harmony parts and no melody, or two or more parts in general that are not designated as melody or harmony.

Using singing as an example, contrary to prior art games where a person chooses that they want to sing lead vocals or backup vocals at the beginning of a song, and are forced to remain with that selection for the duration of the song, in the in present invention, microphones 110 are not tied to a particular part. For example, a player can sing melody vocals and then, during the song, begin singing harmony vocals with no additional input to the game (e.g., the player does not need to pause the game, press a button, or manipulate a menu to switch parts). Instead, one aspect of the present invention dynamically determines which part a player is singing and associates input from that microphone 110 with that part "on the fly." As an example, in FIG. 2, multiple parts are be displayed on the display 105, each with its own respective vocal cue 220*a*, 220*b*, 220*c* (or target music data) indicating the pitch the player is supposed to input (the height of the cue in the lane 200) and for how long (represented by the vocal cue's horizontal length). When a player sings into a microphone 110, the game platform 100 receives the input via the microphone and processes the input. The game platform 100 determines, e.g., via the singing analysis module 130, which of the parts the player is trying to sing based on a degree of matching between the input and each part. When the game platform 100 determines that the user is singing a different part, e.g., the player was singing the melody and is now singing the harmony, the game platform detects this change and associates the input with the harmony part.

Figure 3A:
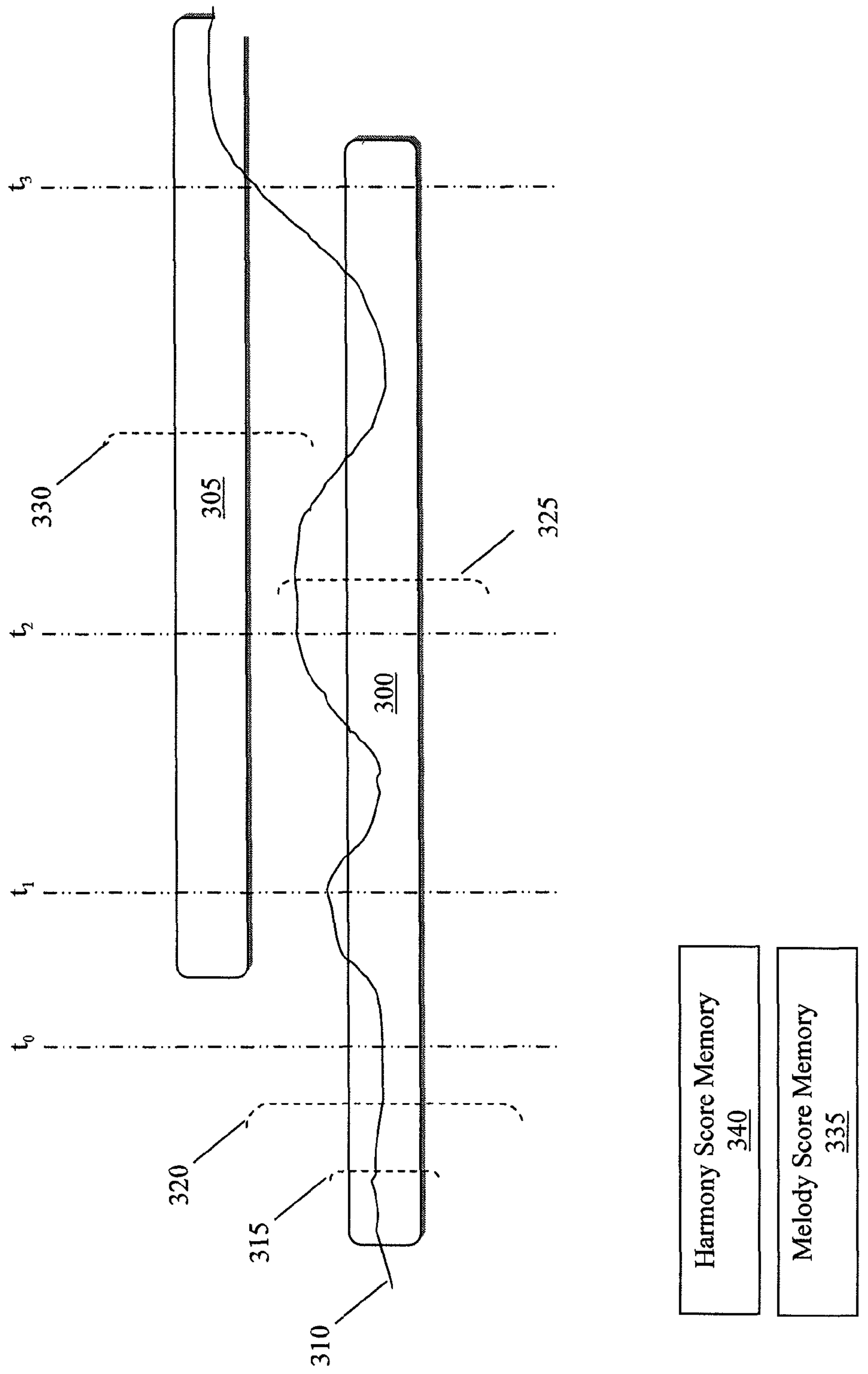
FIG. 3A depicts an example of a player's input compared to vocal cues of two vocal parts.

FIG. 3A depicts an example of a player's input compared to vocal cues of two vocal parts, in this example, a cue 300 associated with the melody part and a cue 305 associated with the harmony part. "Parts" are represented throughout the musical composition by a series of vocal cues displayed to the players. In FIG. 3A, the player's input is represented, over time ($t_0$-$t_3$), by line 310. Since various players have various singing abilities, each cue, 300, 305 has a pitch tolerance threshold (typically not displayed to the player). The player's input is supposed to be within this tolerance threshold 300, 305 to count as successfully singing that cue. The pitch tolerance threshold for each cue 300, 305 can vary according to the difficulty of the game, and can vary for each part. For example, for a "hard" difficulty setting, the player's input pitch would need to be within range 315 above or below the melody cue 300 to count as being successful. Where the game is set to an "easy" mode, the tolerance threshold is significantly more forgiving and a greater range 320 above and below the expected pitch is allowed. Range 325 represents a forgiveness threshold for a medium or normal difficulty setting and is used for the remainder of the example. In some embodiments, the note tubes 300, 305 become "fatter" or "skinnier" (e.g., vertically wider or thinner) the easier or harder, respectively, the game is set to, and the note tubes 300, 305 themselves can represent the boundaries of their respective pitch tolerance thresholds in some implementations.

Figure 3B:
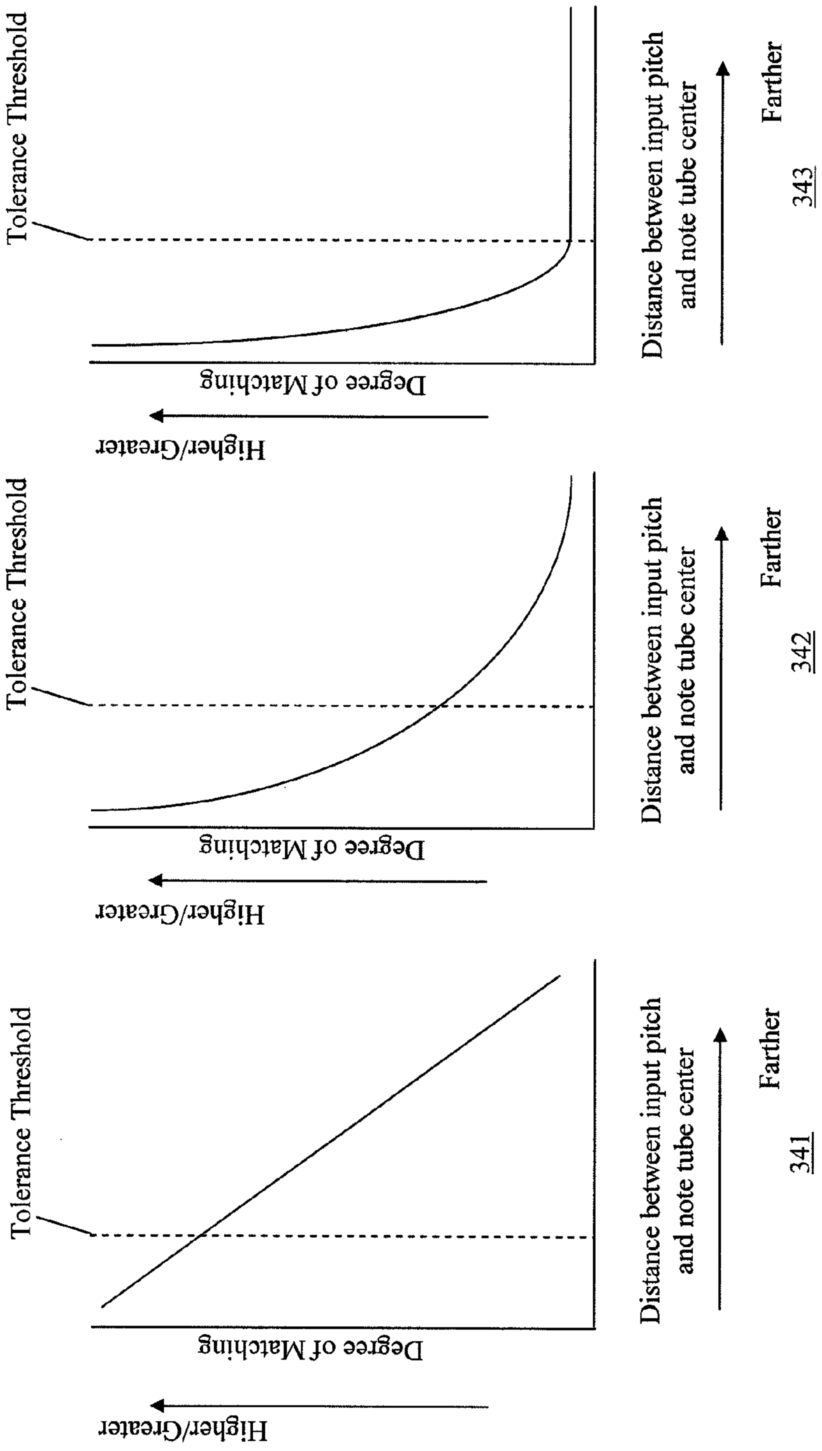
FIG. 3B depicts relationships between the distance an input pitch is from the center of a note tube and the corresponding degree of matching used in some implementations of the invention.

When comparing the pitch of an input to the expected pitch represented by a note tube (target music data), a degree of matching is determined based on how close or how far the input is from the expected pitch. FIG. 3B depicts relationships between the "distance" an input pitch is from the center of a note tube and the corresponding degree of matching used in some implementations of the invention. Input 310 and note tube 300 are used as examples. In some implementations, there is a linear relationship 341 between the degree of matching and an input pitch's 310 distance from the center of the note tube 300. An input pitch 310 that is closer to the pitch at the center of the note tube 305 has a higher or greater degree of matching. As the distance between the input pitch 310 from the center of the note tube 300 increases, the degree of matching between the input and the note tube decreases.

In some implementations 342, the degree of matching is non-linear as the input pitch 310 gets closer to the pitch of the note tube 300, i.e., as the input pitch gets closer to the expected pitch, the degree of matching increasingly increases. In other implementations 343, there is no degree of matching between the input pitch 310 and the note tube 300 unless the input pitch is within a tolerance threshold 325 of the note tube. In some implementations there is a constant, rather than zero, degree of matching for any input 310 outside the tolerance threshold 325. In either implementation 342 or 343, the degree of matching is non-linear once the input pitch is within the tolerance threshold 325, i.e., as the input pitch gets closer to the pitch of the note tube, the degree of matching increasingly increases. Other implementations (not shown) combine these approaches, for example, there is no degree of matching until the input pitch 310 is within the tolerance threshold 325 and then the degree of matching and distance are linearly related. Other relationships correlating distance between the input pitch and the note tube pitch are also contemplated.

Additionally, in some versions of the implementations above, the pitch distance can be determined modulo octave. Specifically, the octave of the input pitch 310 from the player is not taken into account when determining distance from the expected pitch of the note tube 300. For example, if the pitch of the note tube 300 is a C4 and the input 310 from the player is a C5, the input pitch is a full octave's distance apart. Using MIDI note numbers, for example, the input pitch has a MIDI note number of 72 and the note tube's pitch has a MIDI note number of 60. However, in a modulo octave implementation, the distance would be zero since the difference in octave is not considered, e.g., there is a 12 MIDI note number difference between 60 and 72, but modulo octave, in this case, modulo 12, the difference is zero. For example, if the pitch of the note tube 300 is C4, i.e., MIDI note number 60, and the input 310 from a player is the B below C5, i.e., MIDI note number 71, the distance can be computed as 11 MIDI note numbers difference. However, the distance between C5, i.e., 72, and B4, i.e., 71, is only 1, so preferentially the distance is instead determined to be 1. These eleven MIDI note numbers correspond to 11 half steps pitch-wise, i.e., C4 to D (1 step) to E (1 step) to F (½ step) to G (1 step) to A (1 step) to B (1 step). The distance, however, is only one half step, i.e., B to C because the implementation is modulo octave.

Another way of calculating the modulo octave operation is to determine the MIDI note number of the input pitch, increment or decrement it by octaves until the MIDI note numbers of the pitch above and below the target music data MIDI note number are known, and then determine the minimum difference between the target pitch and the modulo pitches above and below it. As an example, an input pitch has a MIDI note number of 86 (D6) and the note tube's pitch has a MIDI note number of 60 (C4). The input pitch's MIDI note number is decremented by an octave until it is within an octave of the MIDI note number of the target music data, i.e., 86 (D6) is decremented to 74 (D5), and, since 74 is still not within an octave of 60 (C4), the MIDI note number is decremented again to 62 (D4), which is within an octave above the MIDI note number of the target music data (D4 is an "above-MIDI note number"). Then, because the difference could be smaller if another octave decrement is performed, the MIDI note number of the input pitch is decremented again to 50 (D3) so it is below the MIDI note number of the target music data (D3 being a "below-MIDI note number"). Then the minimum of the difference between the MIDI note number of the target music data and the above-MIDI note number and the MIDI note number of the target music data and the below-MIDI note number is determined, i.e., 62−60=|2| and 50−60=|−10| (absolute values are used to negate negative numbers). Thus, because the difference between the above-MIDI note number and the target music data MIDI note number is smaller, the singer's input is scored as if it were sung at the above-MIDI note number, i.e., 62 (D4). The same principle is applied when the singer's input is below the pitch of the target music data; the input pitch is incremented octave by octave until the pitches within an octave below and an octave above the target music data's pitch are determined and the minimum difference is determined.

As a result, in some implementations, the degree of matching is not directly correlated to the distance of the input pitch 310 from the note tube 300, or as the difference expressed as MIDI note numbers. As an input pitch 310 gets farther away from the pitch of the note tube 300, after crossing half of the scale, the input pitch begins getting closer to the octave above the pitch of the note tube, and thus getting closer to the pitch, modulo octave, of the note tube. As a result, since octave differences are not considered, the degree of matching actually increases after the input pitch exceeds the halfway mark. Though MIDI note numbers and "pitch steps" are used above to describe the modulo octave example, the invention is not limited to this form of "distance" and, in many implementations, a difference in frequency from the input pitch and the note tube pitch is used in distance calculations.

Advantageously, in some implementations, the accumulation of points for a given note tube 300 is directly correlated to the degree of matching between the pitch of the input 310 and the pitch of the note tube 300. A high degree of matching will generate a large number of points and a low degree of matching will generate a low number of, or zero, points. Where the relationship between the degree of matching and the distance is non-linear, the closer the input 310 is to the pitch of the note tube 300, the faster score accumulates. Also, in some versions, a constant amount of points, or no points, are accumulated when the input pitch 310 is anywhere outside the tolerance threshold 325 of the note tube 300 because there is a constant or zero degree of matching.

Referring back to FIG. 3A, presented is an implementation where the degree of matching between an input and a cue is zero for any input that falls outside the threshold for that cue. At to, the player is singing the pitch for cue 300 nearly perfect, and so there is a high degree of matching between the note tube 300 and the pitch that the player is inputting 310. At $t_1$, the player's pitch 310 is outside the range of the note tube 300, but is within the tolerance threshold 325. Therefore, the input 310 still has a degree of matching with cue 300 and so will be scored as being correct for cue 300 (even though the player's pitch at $t_1$ has a lower degree of matching to the expected pitch of the note tube 300 than at $t_0$). As stated with respect to FIG. 3B, in some implementations, the closer a player's input is to the middle of a note tube, i.e., the higher the degree of matching between the player's input and the pitch of the part for that point in time, the faster their score for that part is accumulated. The farther away from the middle of a tube 300, the lower the degree of matching and the slower their score accumulates for that cue, e.g., at $t_1$ compared to $t_0$ and more so at $t_2$. In other embodiments, successfully singing the part anywhere within the tolerance threshold 325 is considered correctly singing the part and the degree of matching is high throughout the area of the threshold and low or nonexistent outside the area of the threshold 325.

One of the benefits of the present invention is that when the player wants to shift parts dynamically, the game platform 100 allows them to do so, even in the middle of a phrase. When a player's input 310 is outside the tolerance threshold 325 for a particular cue 300, 305, the input 310 is no longer assigned to that part and the player is considered not to be singing that cue. For example, in FIG. 3A at $t_3$ the player's input 310 is outside the tolerance threshold 325 for the melody cue 300. As a result, there is a low or zero degree of matching between the player's input 310 and the note tube 300. Similarly, the player does not accumulate any score with respect to the melody cue 300. However, because the player is within the pitch threshold 330 for the harmony cue 305, the player is scored as considered to be singing the harmony cue. In embodiments where the degree of matching varies within the threshold 343, at $t_3$ the player's input accrues score slowly because it is still comparatively far from the center of the note tube 305.

To appreciate the dynamic part determination, consider in FIG. 3A, that input 310 is has a degree of matching with the melody vocal part 300 at $t_0$ and $t_1$. At $t_3$ and after, input 310, however, has a very low degree of matching (in some implementations has no degree of matching) with the melody cue 300 and therefore input 310 is not assigned to the main vocal part at $t_3$ or after. When the game platform 100 determines, e.g., via the singing analysis module 130, that input 310 has a greater or higher degree of matching with the harmony cue 305 at $t_3$, compared to another part, 300 at $t_3$, then the game platform assigns the input 310 to the harmony part and scores the input against the harmony cue 305 accordingly. This occurs even if input 310 was previously assigned to another part earlier in the phrase or song. For example, at $t_3$ input 310 is assigned to the harmony part based on the degree of matching with harmony cue 305 even though the input 310 was assigned to the melody part at $t_0$ and $t_1$ based on the degree of matching with melody cue 300.

In embodiments with instruments, the degree of matching can be based on how close a provided input is to a particular part over a period of time, e.g., if, for example, a lead guitar part and rhythm guitar part both have a sequence of target music data, e.g., green gem, green gem, and then the lead guitar has a blue gem while the rhythm guitar has a third green gem, the player performing a third input corresponding to a green gem indicates that the player is attempting to play the rhythm guitar part and not the lead guitar part. Beneficially, allowance is made for the player to make mistakes, for example, in the prior example, if the fourth and fifth inputs for the lead guitar part are also blue gems and the rhythm guitar part is two more green gems, if the player plays a third input corresponding to a blue gem (indicating the lead guitar part) but mistakenly provides an input corresponding to the green gem part on the fourth input (which would indicate the player is attempting the rhythm guitar part), when the fifth input is provided as corresponding to a blue gem (again, lead guitar), the degree of matching allows for the mistaken input corresponding to the green gem and still indicates that the player is attempting the lead guitar part. In some embodiments, the degree of matching for instruments takes into consideration the proximity of the gem when determining if a mistake was made. For example, in the prior example, if the green gem is separated from the blue gem by a red gem, the player providing input corresponding to the green gem on the fourth input may not be determined to be a mistake because the green gem is too far, gem-wise, from the blue gem. In that scenario, the player would be assigned to the rhythm part. If, however, the fourth input corresponded to the red gem, because the ref gem is next to the blue gem, that is, in close proximity, the game platform determines that the fourth input, which does not correspond to either part, is a mistake and keeps the player associated with the lead guitar part.

Biasing A Music Performance Input to A Part

Dynamic part determination, however, presents an interesting problem itself: which part is input 310 assigned to when it is within the tolerance thresholds of two parts, i.e., 325 for the melody 300 and 330 for the harmony 305 such as at $t_2$? In scenarios where it is ambiguous which part the player is singing, including cases where the harmony and melody parts use the exact same pitch, a method of determining which part the player is likely singing is necessary to bias a player's input 310 towards a particular part to ensure proper scoring.

Still referring to FIG. 3A, in some embodiments, the player is scored for both parts 300, 305, and when it is determined which part the player is singing, e.g., via the dynamic part determination above, then the score accumulated for performing that part, e.g., 300, is assigned to the player and the score for the other part, e.g., 305, is discarded (since input 310 falls outside the threshold 330 for the harmony 305 after $t_2$, the player is determined not to have been singing the harmony 305 at $t_2$).

In some implementations, for cases like at $t_2$ where the part a player is trying to input is ambiguous, i.e., the singer could be attempting to sing 300 or 305, historical data is examined to determine which part the player is intending to sing, in effect, making a player's input 310 "sticky" to a particular part the singer sang before. Historical data can be any information collected prior to the period of determination, e.g., a prior degree of matching between a prior input and a prior part, a score for each part based on prior degrees of matching between prior performance and prior cues, prior performance data from prior songs, etc. As an example, the game platform may store scoring data accumulated for a particular time period or window, e.g., the last 10 seconds, and store that scoring data in memory in locations such as melody score memory 335, and harmony score memory 340 (though again, the game may simply refer to these as part 1 score memory, part 2 score memory, etc, where there is no designated melody or harmony). Though not depicted, historical information for any number of parts and for any length of time can be stored and used to in this calculation. Parts can be of any type (e.g., a second harmony part or an instrument part) and time periods may be of any length (e.g., seconds, the length of the entire current song, or the span of multiple song performances in the past). One use of the historical information is demonstrated with respect to $t_2$.

During $t_0$-$t_2$, the player is accumulating score for the melody part while the singer is within the tolerance threshold 325 (or alternatively at varying rates depending on his accuracy within the threshold to the melody 300). By $t_1$, the player's input 310 has not entered the threshold 330 for the harmony cue 305, and therefore the player has not accumulated any score for the harmony part, but has accumulated score for the melody part (though scoring per "part" can be based on generating a score for a cue, for a series of cues, or for portion of a cue, score can be kept per part, even across phrases). Approaching $t_2$, the player continues to accumulate score for the melody cue 300 because input 310 is still within threshold 325 (and may slow as the singer gets further from the center of the tube 300). The score information for the melody cue 300 is stored periodically, e.g., every $60^{th}$ of a second, in the melody score memory 335. As the player's input 310 approaches $t_2$, it also enters threshold 330 for the harmony cue 305 and the player begins accumulating score for the harmony part. This score information for the harmony cue 305 is stored in the harmony score memory 340. Since it is ambiguous which part the player is trying to sing due to the overlapping thresholds 325 and 330, the game platform allows for the possibility that the player could be singing either part and therefore generates a score for both parts simultaneously depending on the degree of matching between the input 310 and each respective cue 300, 305. However, the player is still assigned to the melody part for the period where there is ambiguity because the score in the melody score memory 335 is higher than the score in the harmony score memory 340 (because the singer was singing the melody prior to the ambiguity period).

Note, because the player may switch parts at any time, the historical information is typically consulted only when it is ambiguous which part is being sung. For example, at $t_3$ in some implementations, there is no ambiguity as to which part the player is singing—input pitch 310 is outside the tolerance threshold 325 and therefore it is determined that the player cannot be singing the melody cue 300 and must be singing harmony cue 305. In some implementations, where the input falls outside the tolerance threshold of a cue, the historical data stored in melody memory 335 and harmony score memory 340 is not consulted and that player's input is no longer assigned to that part regardless of history. However, should the player's input 310 again enter the threshold 325 of the part 300, and it once again becomes ambiguous which part is being sung, the historical data is consulted and the player's input 310 could be reassigned to the original part 300.

Biasing a player is also particularly useful when parts directly overlap, e.g., when the melody and harmony have the same pitch. Without biasing a player to a part, a scenario could result where, before the parts converged, a first player was singing the melody and the second player was singing the harmony. Upon convergence, because both players would be within the threshold of the part they were not singing, they could conceivably be scored for singing the other part. Naturally, this is not desirable—if the player singing the melody was consistently accurate before the convergence—and therefore accumulating bonus points—and then awarded no points during the convergence because the singer was scored only for the harmony part, this would ruin a player's enjoyment of the game. Instead, by determining that the first player was singing the melody before and is likely singing the melody now based on the historical performance data, the player is still associated with the melody during the converged, overlapping parts. Biasing the singer to the melody allows the singer to continue accruing score and bonus points for the melody. Likewise, if a player was singing the harmony part and the two parts converged, it would be undesirable to score the singer for only the melody parts, thereby negatively impacting his score for the harmony portion.

Figure 3C:
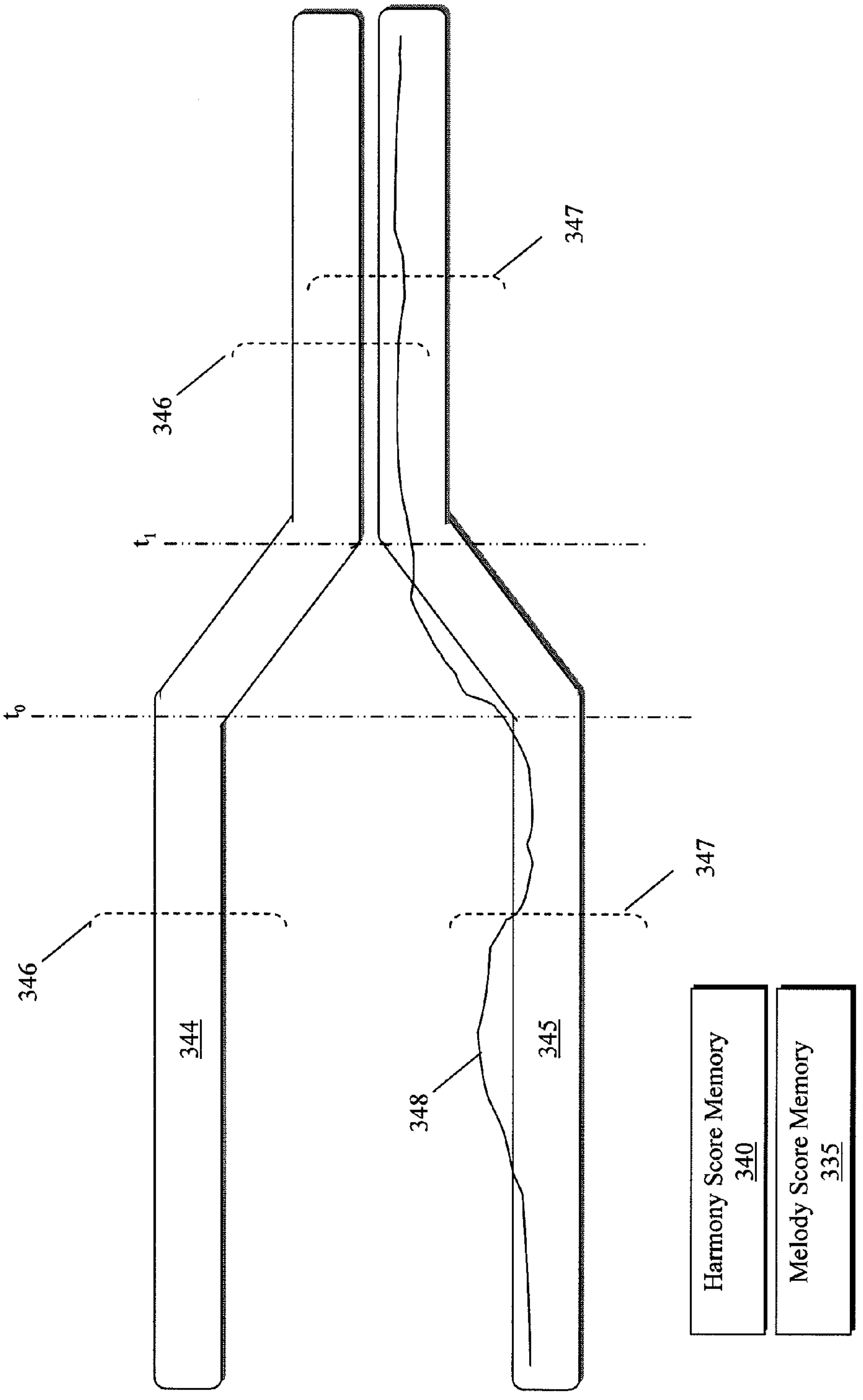
FIG. 3C depicts a scenario where two vocal parts converge and the part being sung becomes ambiguous.

FIG. 3C depicts a scenario where cues for two vocal parts converge and the part being sung becomes ambiguous. In FIG. 3C, vocal cue 344 represents one part, such as a harmony part, and vocal cue 345 represents a different part, e.g., the melody part. Each cue has a tolerance threshold as described above with respect to FIG. 3A, i.e., threshold 346 is for cue 344 and tolerance threshold 347 is for cue 345. The singer's input is depicted as line 348. Before to, the singer's input 348 is within the tolerance threshold of only cue 345 and score data based on the degree of matching between input 348 and cue 345 is stored in melody score memory 335. Around $t_1$ however, the cues 344 and 345 converge to similar, though not exactly the same, pitches. As a result, the singer's input 348 enters the tolerance threshold 346 of cue 344 while also still being within the tolerance threshold 347 of cue 345. As described above, when an input is within the tolerance threshold of cues for two or more parts, it becomes ambiguous which part is being sung. Beneficially however, up until $t_1$, score data has accumulated in melody score memory 335 but not in harmony score memory 340. As a result, during the period of ambiguity (after $t_1$), the game platform 100 determines which part is being sung using the various methods described herein, such as determining the degree of matching between the input 348 and cue 345 compared to the degree of matching between the input 348 and cue 344, as well as determining the stickiness to the cues of 345 based on the score data stored in melody score memory 335 compared to the lack of, or minimal, score data stored in harmony score memory 340. Again, melody score memory 335 and harmony score memory 340 are simply reflective of memory for two different parts. Additional memory could be used for a second harmony part or the memory could not be designated as being for a melody or harmony part, instead simply being memory for part 1 (one), part 2 (two), part 3 (three), and so forth for any number of parts.

Figure 3D:
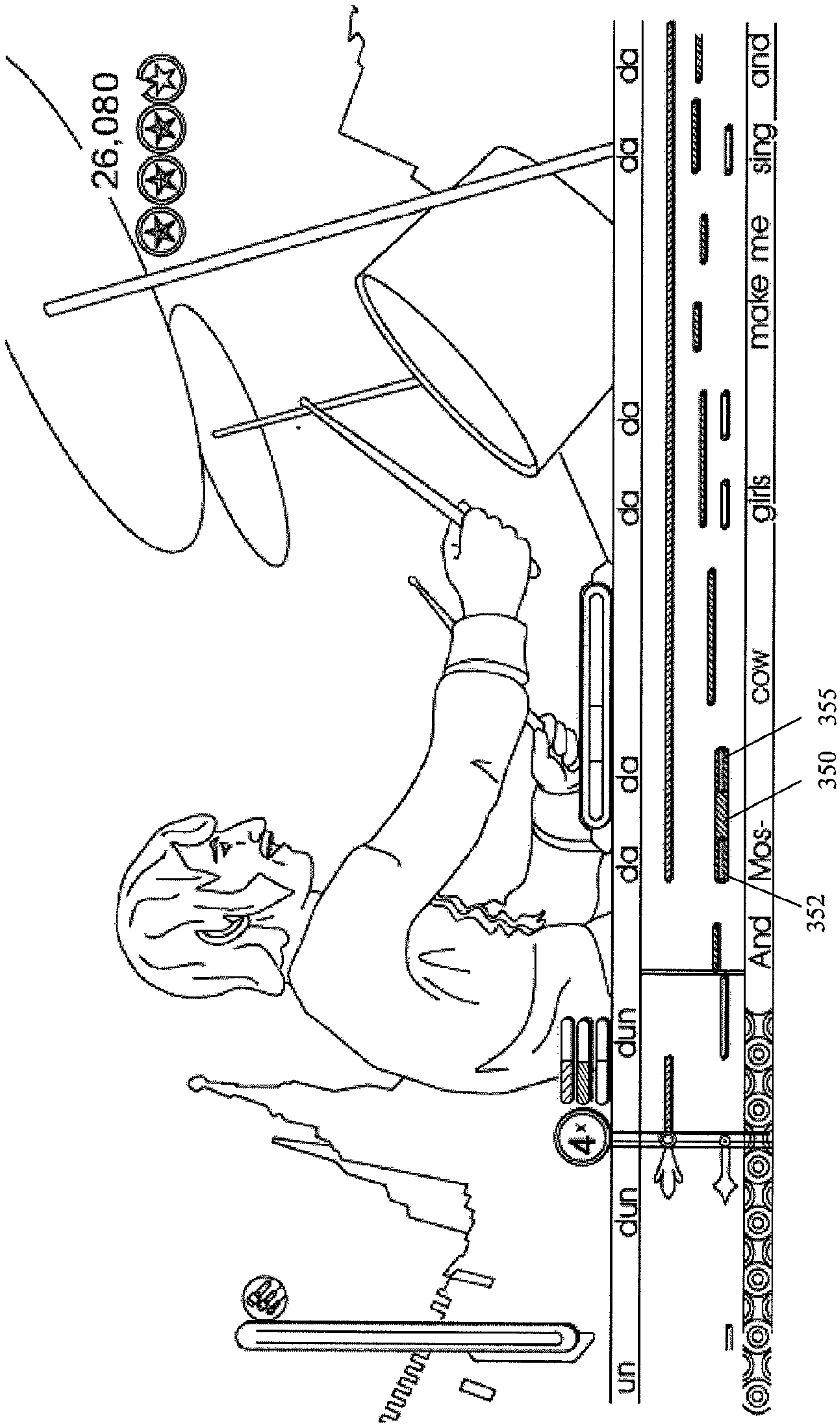
FIG. 3D depicts a scenario where two parts, a melody and harmony, overlap.

Another example of parts converging, specifically overlapping, is depicted in FIG. 3D. In FIG. 3D, the melody and harmony parts overlap 350, 352, 355. If a player is singing the pitch shared by the melody 350 and harmony parts 352, 355 there is ambiguity between which part the singer is singing, i.e., the singer could be singing the melody ("Mos") or the singer could be singing the harmony (two "da" syllables). If the person singing melody—and therefore singing "Mos"—is incorrectly assigned to the harmony part, score is only generated for portions 352 and 355. In those scenarios, the player would get no score for successfully performing the melody portion (the game assigns the singer to the harmony portion and scores for that) and potentially a diminished score for the harmony portion (because that region is not scored for the harmony section and thus his singing is incorrect). However, biasing the player to a part overcomes this. If the player is biased towards the melody portion 350, for example his historical score for the melody is high while his historical score for the harmony is low, then the singer will be assigned to the melody 350 and scored correctly. However, the player that is biased by the game toward the harmony part will be scored only for the harmony cues 352, 355 and will not be negatively scored for not singing the melody at 350. Referring to the harmony cues 352, 355, advantageously, in some versions, where there is an ambiguity as to which part the player is singing, and the part the input is assigned to has a rest period, i.e., a cue is not present such as between cues 352 and 355, a score will be generated for not singing. In other words, where the part is ambiguous and the player is not singing when the part the singer is assigned to is not supposed to sing, the game platform 100 will generate a score for the part, based on the fact that the player silent where the singer is supposed to be silent.

Figure 3E:
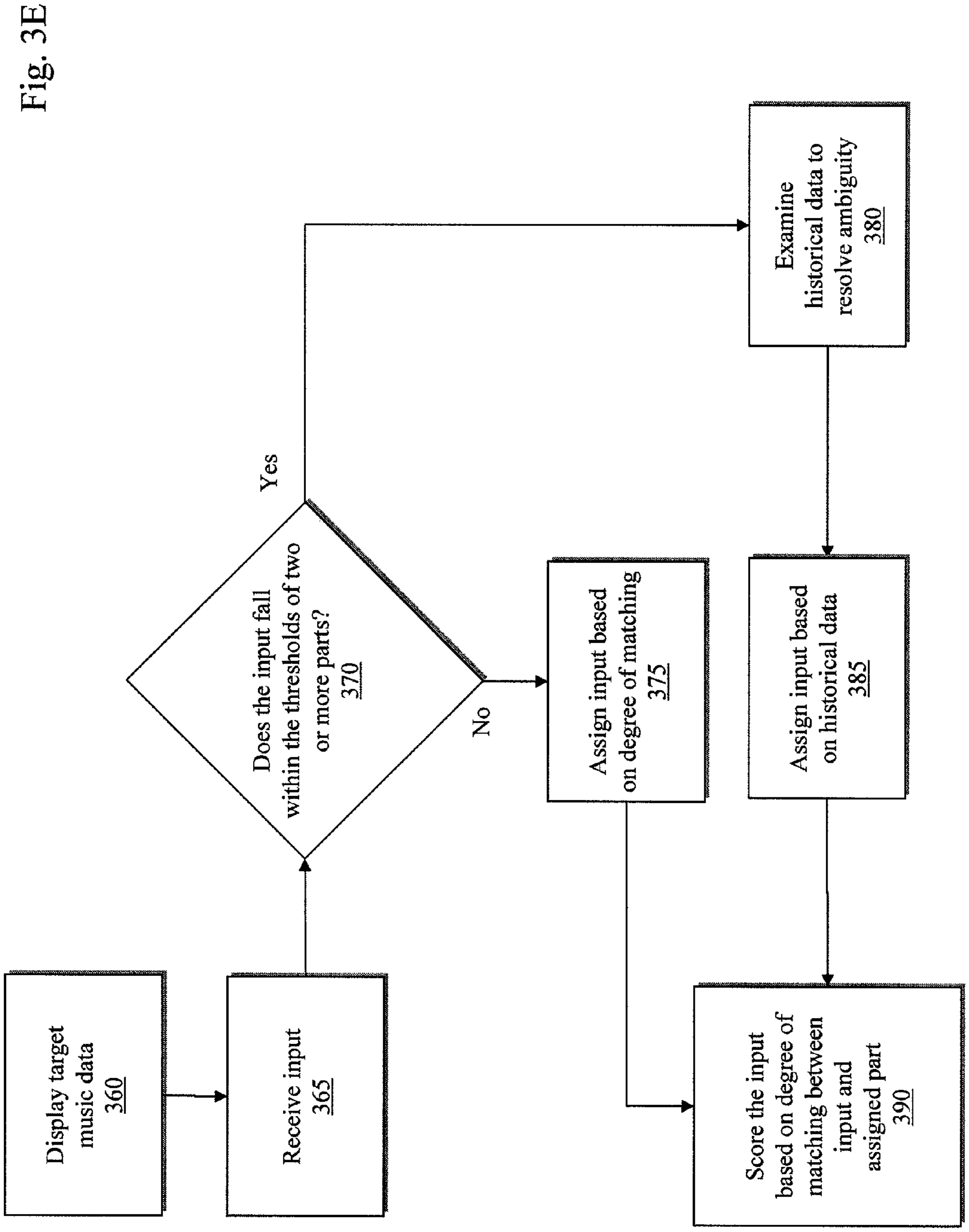
FIG. 3E depicts a block diagram outlining some procedures the invention executes on the game platform 100 to assign a part.

FIG. 3E depicts a block diagram outlining some procedures executed on the game platform 100, in certain embodiments, to assign a part. The target music data is rendered by the game platform and displayed (360) on the display. Input is received (365), typically via an instrument or microphone, in response to the display of the target music data (360) as a player plays the game. The game platform, e.g., via the singing analysis module 130, determines (370) if the input falls within the tolerance threshold of cues of two or more parts. If not, singing analysis module assigns (375) the input to the part that corresponds to the cue with the highest degree of matching with the input. If so, the historical data, e.g., a prior degree of matching with a part, a prior score for a prior input that was assigned to the part, etc., is examined (380) to determine which of the two or more parts the input should be assigned to, and the input is assigned (385) to the determined part. After the assignment, regardless if the input was within the thresholds of cues for multiple parts or not, the input is scored (390) based on a degree of matching with cues of the assigned part. Though biasing a player towards a particular part is useful, it may not be enough when the game platform determines later that it assigned the input to the incorrect part.

Scoring Musical Performances During and After Periods of Ambiguity

Figure 4A:
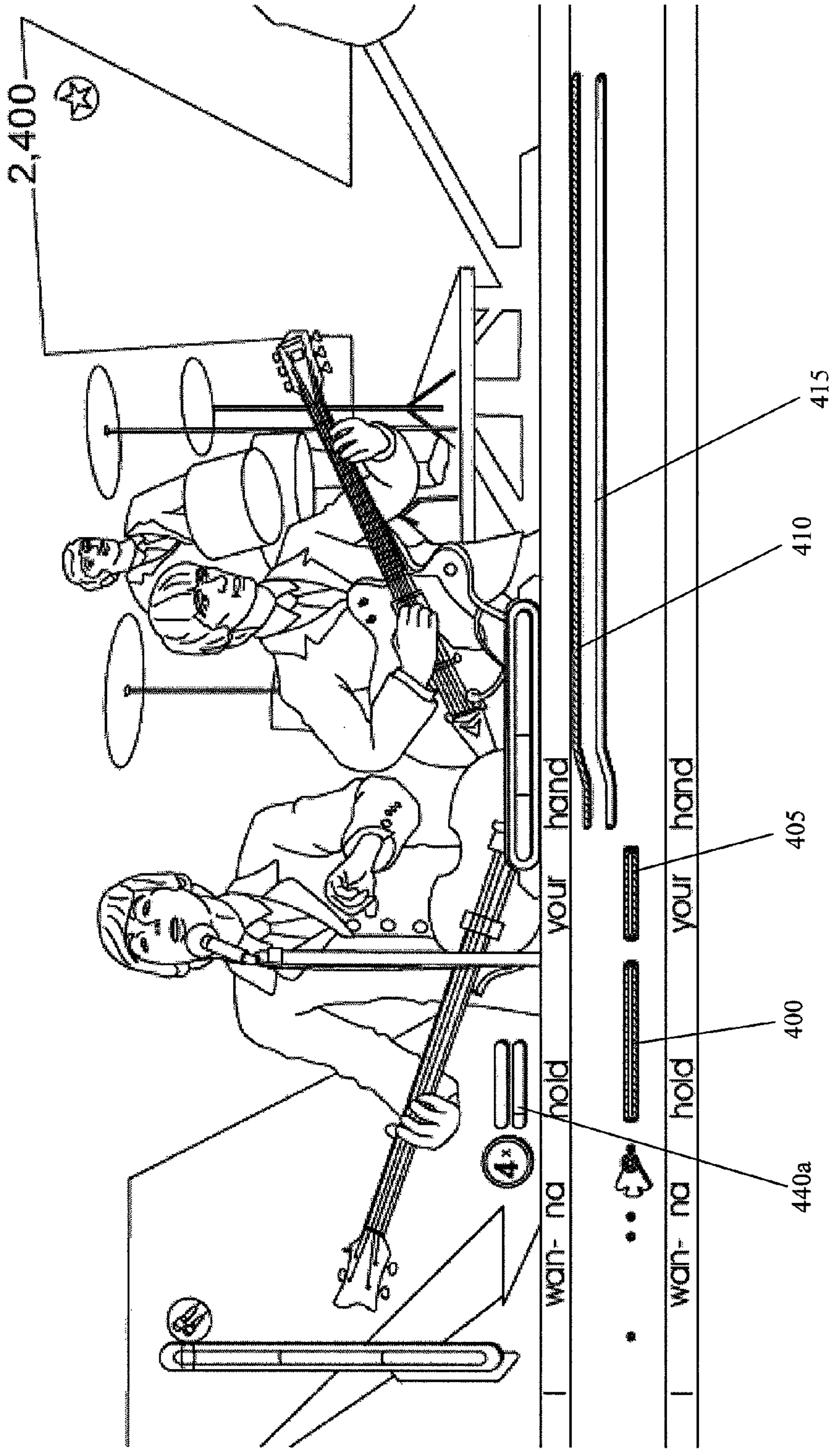
FIG. 4A depicts an exemplary screenshot where part assignment based on biasing may be incorrect and scoring is retroactively reassigned.

FIG. 4A depicts an exemplary screenshot where part assignment based on biasing may be incorrect and scoring is retroactively reassigned. In FIG. 4A, the melody and harmony parts are sung with the same pitch for the cues 400 and 405 (the parts overlap so an indication is given on screen that the two parts are co-located, e.g., one part is outlined with the colors of the other part, the two parts alternate being displayed, effectively flashing each part at opposing times, or other visual effects). The singer's input is currently assigned to the melody portion using the biasing technique above, and as the player sings the cues of the melody, the performance meter 440*a* fills up. When the singer reaches the vocal cues 410, 415 associated with the lyric "hand," the two parts diverge and use different pitches—the harmony cue 410 has a higher pitch than the melody cue 415. When the singer begins singing either part, it is known at that point which part the player is singing because the input will be outside the tolerance threshold of one of the vocal cues, either 410 or 415. If the player sings the melody 415, then the scoring originally generated for the melody, and reflected in 440*a*, is correct and no retroactive scoring is necessary. However, if the player sings the harmony 410, the game platform does not penalize the player for the game platform assigning the player's input to the incorrect part for 400 and 405. Instead, the game platform, after the ambiguity is resolved, grants the players the points accumulated for the melody section for 400 and 405 during the ambiguity period. In some implementations, points scored before an ambiguity period, e.g., when the player was known to be singing the melody, are not assigned to the player for performance of the harmony after the ambiguity period—it is only score that accumulates during an ambiguity period that is retroactively assigned. In some embodiments, resolution can be delayed as long as an ambiguity period lasts, even across phrases or potentially throughout a song. In other embodiments, if the ambiguity still exists at the end of a phrase, the input is assigned to the part with the higher score, assigned to a part randomly, or assigned to a preferred part, e.g., always assigned to the melody or first part.

Figure 4B:
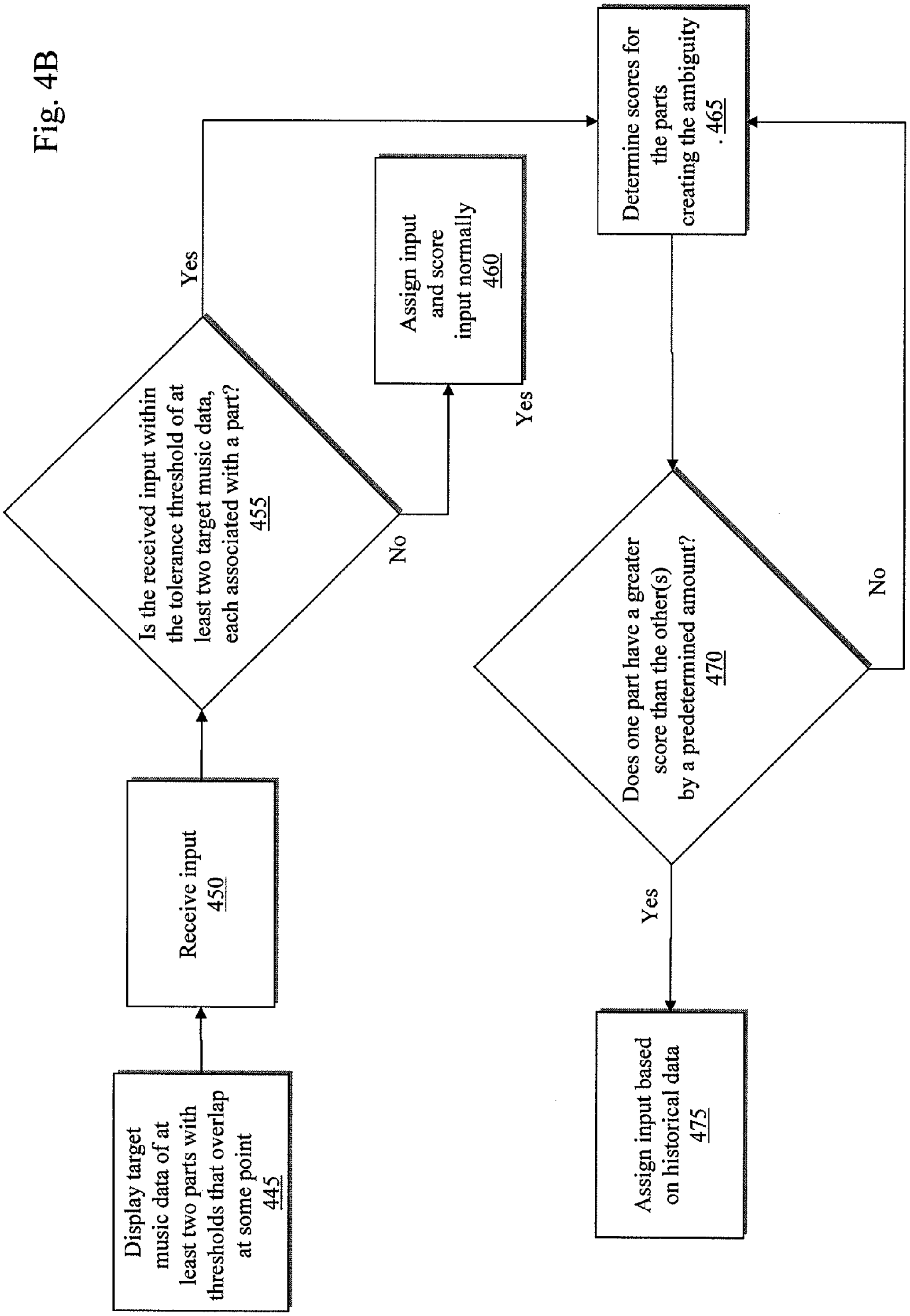
FIG. 4B depicts procedures executed by the invention during a part ambiguity.

FIG. 4B depicts procedures executed by the invention during a period of ambiguity described above. First, the note tubes (target music data) associated with a part are displayed (445) on the display. Additionally, note tubes for a second part are also displayed on the display. Then the singing analysis module 130 receives (450) the input from the player via, e.g., a microphone. Then a determination (455) is made by the singing analysis module 130 if the received input data reflects a vocal performance that is within the tolerance thresholds of at least two of the target music data, e.g., is within the tolerance threshold of two parts. If not, the input is assigned to a part (if within a threshold at all) and scored (460) as it normally would be. If so, however, the singing analysis module 130 determines (465) a score based on the degree of matching with the note tubes of the first part and determines (465) a score based on the degree of matching with the note tubes of the second part. Though both parts accumulate score during the ambiguity, eventually one of the parts will have a greater score than the other by a predetermined amount—the player will sing one better or the parts will begin to diverge, etc. The game platform continues (470) to score both until this occurs. When the difference in scores for each part is greater than the pre-determined value, the game platform 100 assigns (475) the music performance input data to the first part or the second part, whichever has the greater score and keeps any score accumulated for the chosen part during the ambiguity as score information for that part.

In some cases, referring back to FIG. 3A, which part a player is singing can be ambiguous, e.g., at $t_2$, without being for the exact same pitch, i.e., can be closer to one part than another yet still ambiguous. In these scenarios, score is accumulated for both parts. In embodiment where score accumulation is based on proximity of the received pitch to the center of the tube, each score is accumulated at a different rate depending on the degree of matching between the input and each part. In some implementations, when the difference between the two or more scores is above a certain threshold—that is a score accumulation for one part is outpacing, or has outpaced, the score accumulation for another part by a predetermined value—the input is assigned to the part with the faster accumulating score. In those implementations, the score accumulated during the period of ambiguity for the assigned part is granted to the player, and the score for the other part, i.e., the slower-accumulated score, is discarded. This approach is also useful where parts diverge from a common pitch to separate pitches over a period of time.

Figure 5:
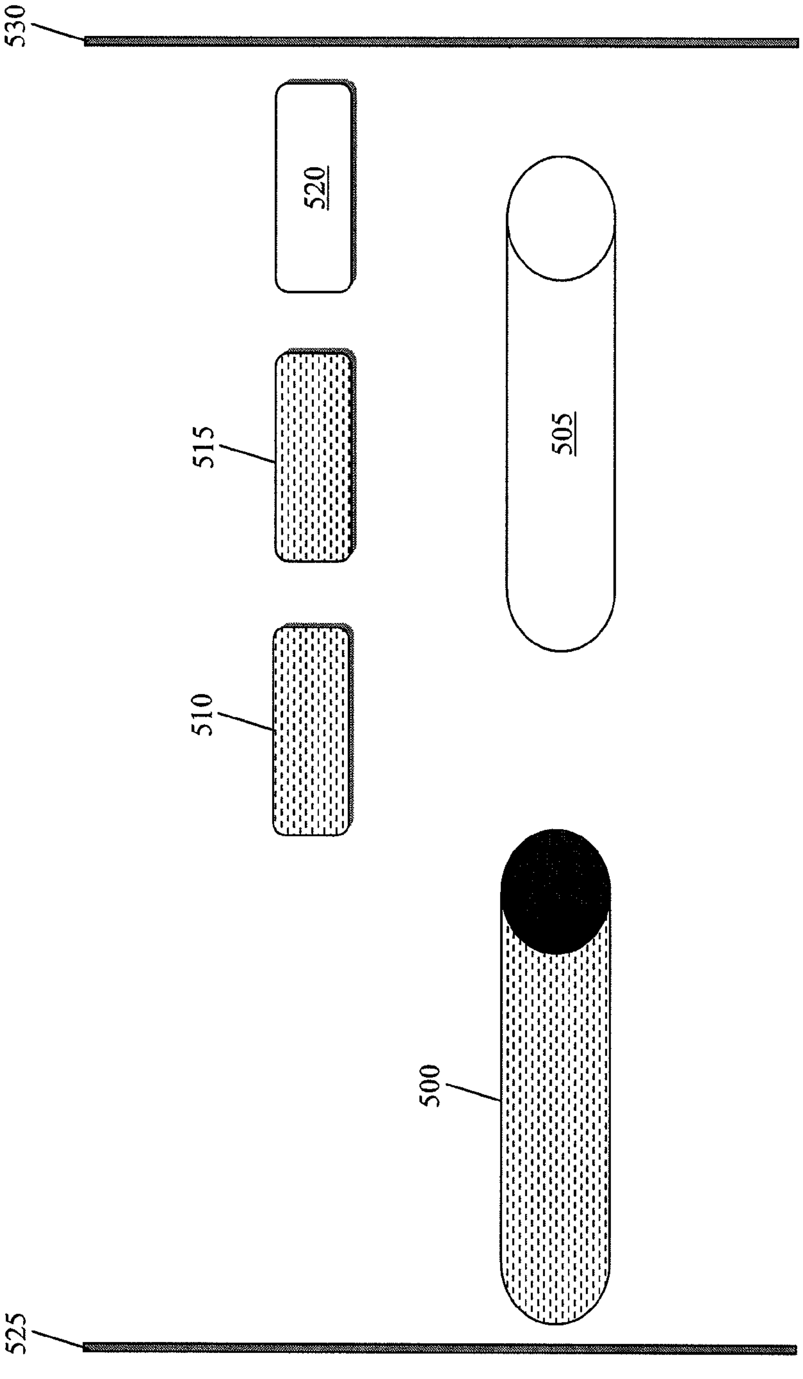
FIG. 5 depicts scoring the performance of different parts.

In some implementations, a score is determined based on which part of multiple parts was performed the most completely for a given time frame, e.g., for a phrase. In some of these implementations, any additional input is treated as a bonus or additional score. For example, in FIG. 5, cues for two parts are displayed: cues for the melody part 500, 505 (depicted as cylinders), and the cues for the harmony part 510, 515, 520 (depicted as rectangles). The shaded cues, 500, 510, 515 represent cues that the player successfully sung and the unshaded cues are ones the player did not sing. Again, because multiple players can contribute vocal (or instrumental) input, 500 could be sung by one person, 510 by another, and 515 by still another. Or one person could sing or play all three tubes, 500, 510, and 515, or players can take turns singing or playing, or other performance variations. Regardless of the number of people singing or playing, it is determined that for the phrase bounded by markers 525 and 530, the input provided successfully matched one half of the melody part, i.e., only tube 500 was performed and tube 505 was not, and two-thirds of the harmony part were performed, i.e., 510 and 515, but tube 520 was not.

In some embodiments, the most completely performed part forms the basis of the score assigned to the vocal "player." In this case, the performance of the harmony cues 510, 515 is more complete for the harmony part than the melody cues 500 were for the melody part. As a result, in some embodiments, the player(s) are awarded 66% of the possible score for the harmony part for the phrase and nothing for the melody. In other embodiments, additional parts that were performed, but not as completely as the most-completely-performed part, are converted into bonus points that are added to the score. For example, the harmony part may be awarded 66% of the possible points for performing the harmony cues, and then 50% of the points possible for the melody are added to that. Or, in some implementations, a fraction of the less-completed score is awarded, e.g., 10% of the possible points for the other parts, in this case 50% multiplied by 10%, so 5% of the possible points for the melody are added to the harmony score. In some embodiments, duration of a cue may play a part in the determination of how complete the performance of a particular part was. For example, performing cue 500 is considered performing seventy five percent (75%) of the melody part because the cue 500 is longer than cues 510 and is deemed "worth more." In some embodiments, performing only a portion of the cues is considered completing it 100% or a completion bonus is added to the amount performed to achieve 100% completion. For example, sustaining a pitch for a particular duration may be heavily weighted (considered a success) and thus performing 500 and only a fraction of 505 is necessary to get a 100% complete.

Allowing for a completion metric and supplemental scoring is beneficial in that it results in additional players singing to enjoy the game and achieve a high score. The supplemental scoring is accomplished by several functions. First, the target music data is displayed on the display 105 by the game platform 100. The game platform 100 then receives music performance input from the player and the player's input is associated with the first music performance, e.g., the player is singing the melody of the song according to the displayed target music data. Then, a new set of target music data is displayed on the display 105 and a new, second, set of input is received by the game platform 100. The game platform 100 calculates a score, e.g., via the singing analysis module 130, for the first input based on the first music performance input data and calculates a second score based on the second music performance input data. Depending on which score is higher—first or second—the game platform chooses one as the preferred score. For illustration purposes, assume the first score was higher. That score—the score for the first part—becomes the effective score for both parts since it was the most complete. However, in some implementations, the second score is not discarded—instead the scores that were not selected to be the preferred scores are modified via a score multiplier and the preferred score is modified based on the non-preferred score and the multiplier. In other implementations, rather than picking a preferred score and adding to it or modifying it, a "final score" is determined based on both score, e.g., they are combined, added, the first is multiplied by the second, the second provides an incremental increase, or other means of combination.

In some implementations, the phrase performance meters 240 reflect the performance so far for a part, e.g., when a first harmony is sixty six percent complete, sixty-six percent of the corresponding phrase performance meter, e.g., 240*b*, fills. Similarly, when fifty percent of the melody is completed, fifty percent of the melody performance meter, e.g., 240*a*, is filled. In some implementations, phrase performance does not directly map to filling a meter. For example, performing sixty percent of a part is "good enough" to consider the phrase two-thirds complete, or eighty percent is good enough to consider the phrase one hundred percent complete where there are four tubes to sing (and thereby each tube counting for twenty-five percent). In some embodiments, the most-completely performed part—or most filled phrase performance meter—contributes to a counter that fills the score multiplier indicators 250, e.g., the more complete the performance of a part, the more the meter is filled. In some implementations, less-complete performances of other parts also contribute to filling the score multiplier indicators 250.

Pitch Guide that Displays Multiple Octaves and Harmonically Relevant Pitches

Figure 6A:
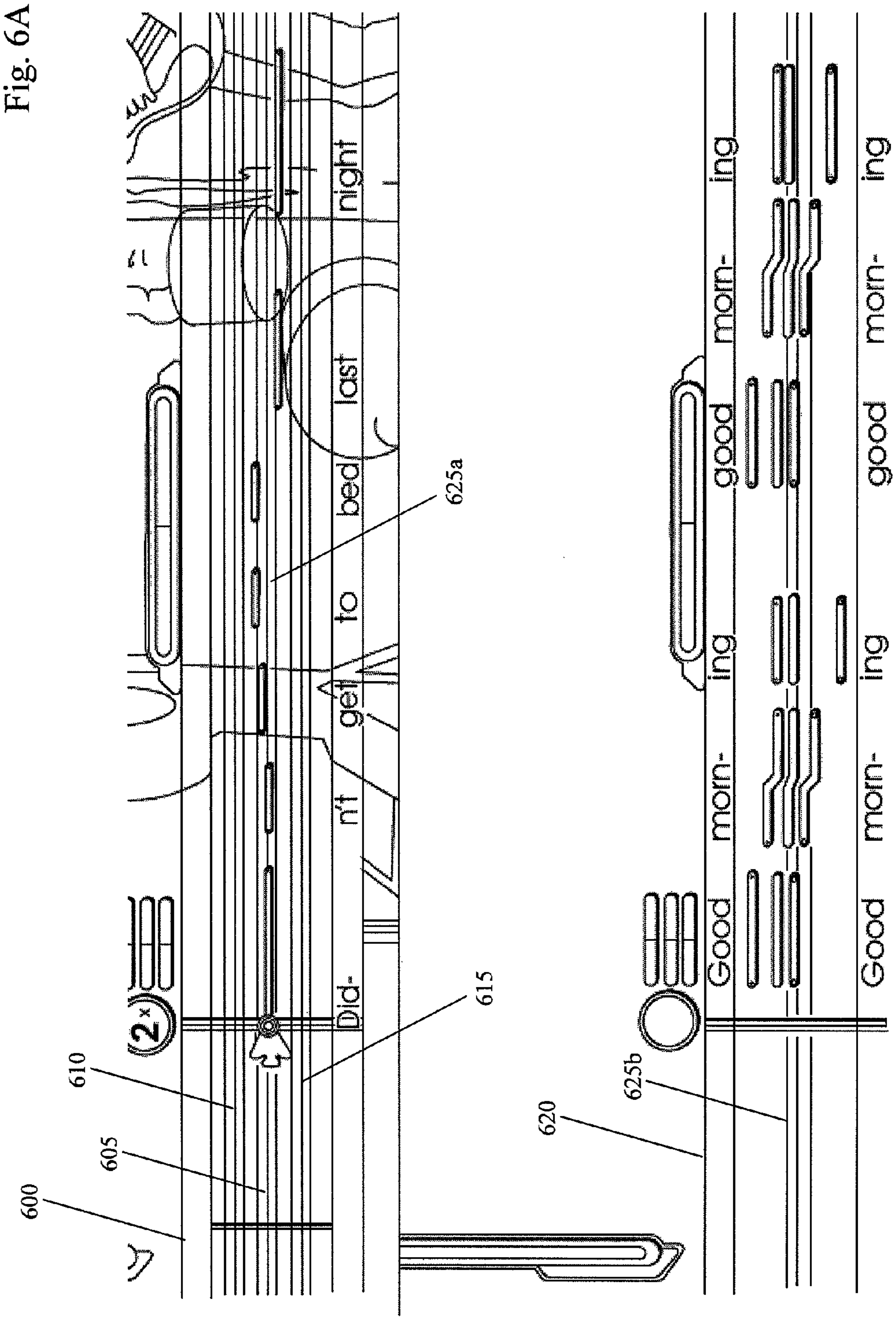
FIG. 6A depicts two embodiments that display different pitch ranges.

One aspect provides an improved method of displaying vocal cues. To increase the player's appreciation of the relative difference between pitches represented by the vertical position of a pitch cue, the shading on the backdrop behind the vocal cues divides the spaces into octave-sized regions. For example, in FIG. 6A, several octave ranges are depicted in lane 600 (denoted by the three groupings of three lines), e.g., an octave the singer is currently singing is 605, an octave above 610 the one the singer is singing, and an octave below 615 what the singer is singing. Displaying the different octaves and specific note intervals in the scale, the game assists players in gauging the pitches the singer is supposed to sing. Showing the player that there are multiple octaves or only one provides context for the player to know how varied a part is pitch-wise. For example, in FIG. 6A, lane 600 displays a large vocal range, where as lane 620, displays only one, or one and a half, octaves. Optionally, the octaves can be colored with different or alternating color patterns such that one octave's background is a dark tan and an octave above or below it is a light tan.

Another beneficial aspect is that horizontal lines 625*a*, 625*b* (collectively 625) (and denoted by 605, 610, 615 as well) in each lane 600, 620 indicate pitches that make musical sense in the context of the song. It is typical for note tubes pictured to line up with one of the background lines because the note tubes represent pitches in the song, and the pitches in the song are typically related musically. As an example, the songs depicted in 600 and 625 could both be in the key of A, in which case the lines 625 indicate A, C#, and E. Though for other songs these lines may refer to different pitches. For example, in the key of Cm, these lines would refer to C, E♭ (E flat), and G. Some songs use a wider range of pitches than others, and the background and line 625 spacing can pan and scale to accommodate variable ranges. For example, lane 600 has a wider pitch range (three octaves) than lane 620, so the backdrops have different vertical scale.

What is harmonically relevant depends on the song. In some embodiments, the horizontal lines reflect specific notes or a scale or chord. For example, the specific notes of a major chord may be the tonic, the 3rd, and the 5th of the scale. In other embodiments, the horizontal lines reflect specific notes of a minor chord, e.g., a tonic, minor 3rd, and 5th of the scale. Optionally the notes could include a 7th or other notes of the scale. In some embodiments the horizontal lines reflect specific notes of a particular mode of a scale, e.g., the Ionian, Dorian, Phrygian, Lydian, Mixolydian, Aeolian, or Locrian modes, or the like. Beneficially, these embodiments can be combined. For example, the game platform causes the display to display the horizontal lines of a first phrase of a song as reflecting the notes a major chord, the horizontal lines of the next phrase is displayed reflecting the notes of a minor chord, and then a third phrase again is displayed reflecting a major chord. Optionally a mode can be substituted for any of the chords in the preceding example. Beneficially, the lines 625*a*, 625*b* indicate the harmonically relevant pitches. In some implementations, 625*a*, 625*b* are not lines, but are perceivable gaps in the coloring or shading of a section.

Before a song begins, the game platform 100 determines, in some implementations by a song analysis module (not displayed), which pitches to demarcate as harmonically relevant. Advantageously, the game platform 100 can also change the demarcations during a song on a per phrase basis if applicable, e.g., the song has multiple keys. The game platform 100 analyzes the song or phrase, (i.e., analyzes the musical data of the song) to determine a scale within the song. The lane is displayed with a number of interval demarcations based on the scale. Also, a background to the lane is displayed with a color scheme that is based on preselected pitches of the scale. Then the song data (or target music data) is displayed.

Beneficially, the display of the pitch range for any phrase is can be dynamic—that is a phrase with low notes can be displayed with a given pitch range and note density and another phrase can be displayed with a different pitch range and note density.

Dynamically Displaying A Pitch Range

Dynamically displaying a pitch range allows the game to display a lane of a constant size, but to shift the displayed area to different upper and lower pitches, and to "zoom in" and "zoom out" of the displayed pitch range to display different pitch or note tube densities. In some embodiments pitch density is the spacing between the note tubes. In other implementations it corresponds to the thickness of note tubes. In still other implementations, pitch density is a combination of tube spacing and tube thickness. Where the pitch density of the current portions is different than the pitch density of a prior portion, the spacing between note tubes or gems of the displayed pitches is changed. Advantageously, some implementations utilize both dynamic range functionalities, that is utilizes both shifting the displayed pitch area and dynamically altering the pitch density. Beneficially, these determinations can be made before gameplay begins or during gameplay on a portion-by-portion basis.

To shift the displayed area, in some implementations, the game platform 100 divides a song into portions. In some implementations this is performed by a song analysis module (not displayed). Portions can be phrases or other musically significant divisions, e.g., bars or groupings of two or more notes. The game platform 100 then determines a deviation between the highest note and the lowest note for each portion to determine the pitch range for that portion. When displayed, the lowest note of a portion of the song typically aligns with the bottom of the lane and the upper note of a portion typically aligns with the top of the lane, even if there is a higher note later in the song. The game platform 100 then determines a pitch density for the entire song—which is used to determine the size of the lane in some implementations—based on the largest pitch range of all portions. This allows the highest note and lowest note of every portion to fit within the viewable area. Then, each portion is displayed via display logic of the game platform 100 within the lane on the display 105. Beneficially, because some portions will have notes that are higher than notes in other portions (or notes lower than those in other portions) the viewable area that displays the notes for that portion can change positions according to the changes in pitches.

Figure 6B:
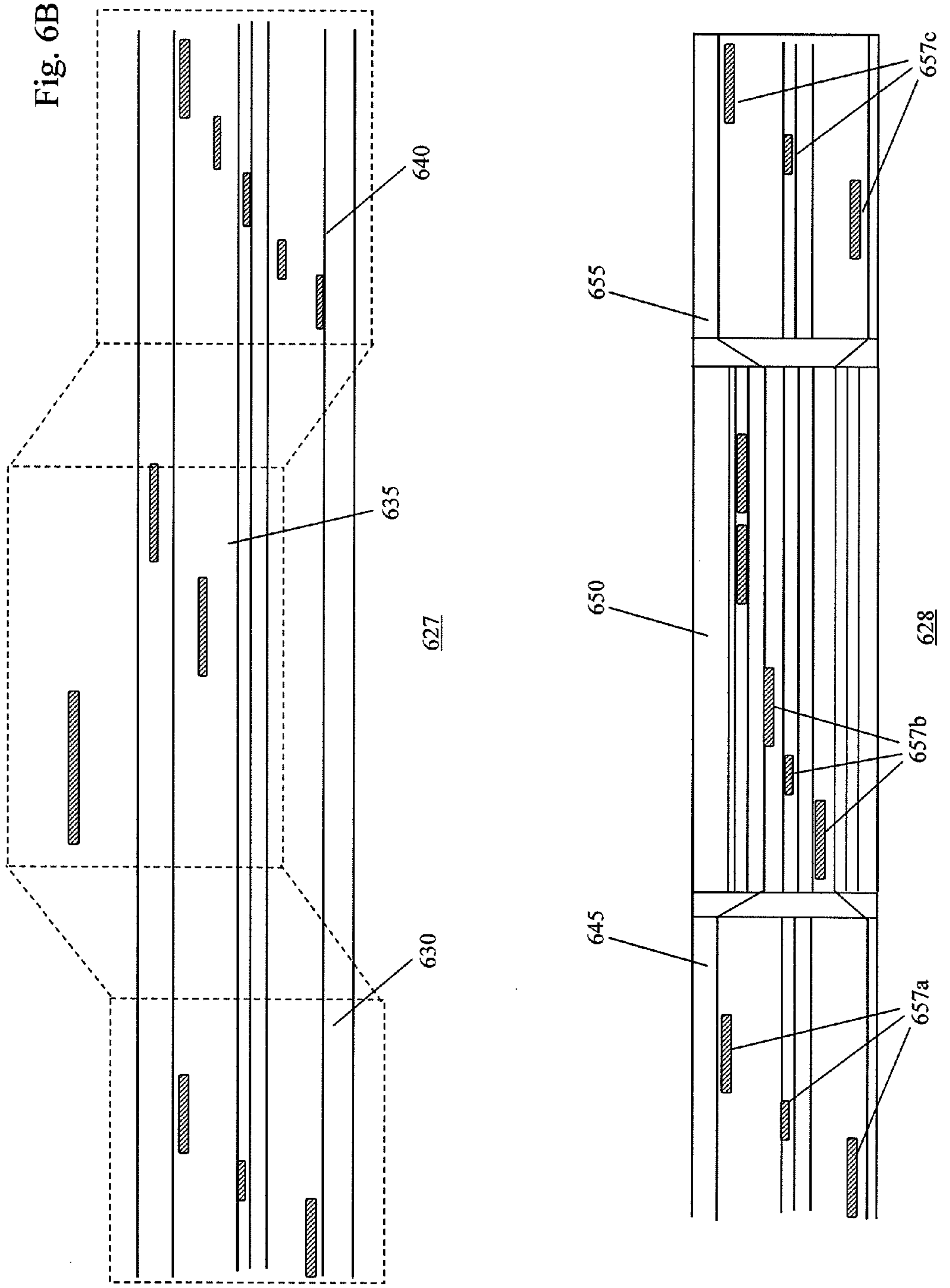
FIG. 6B depicts a shiftable display window and display that utilizes a dynamic zoom.

FIG. 6B depicts a shiftable display window 627 and a display 628 that utilizes a dynamic zoom. Regarding the shiftable display 627, the musical composition is divided up into portions 630, 635, and 640. The pitches of 635 are higher than the pitches of 630 or 640. Rather than create a lane that is based on the lowest note of the entire song and the highest note of the entire song and then display 630, 635, and 640 within that static lane, the present invention shifts the position of the viewable area (shown in box outline) such that the displayed portion encompasses on the range between the highest and lowest notes of that portion. In some versions, as the portions are displayed, the viewable area is shifted or its position altered to reflect the change or transition to the player. For example, transitioning between portion 630 and 635, the viewable area shifts up between the end of 630 and the beginning of 635 to make the higher notes in 635 visible. As a result, the note tubes will appear to slide down, which allows for higher notes to be displayed in the window for the duration of portion 635. This indicates to the player that the notes of 635 should be sung higher than those of 630. A similar transition is made from portion 635 to portion 640, where the viewable area shifts down (causing the note tubes to appear to slide up). To clarify, the viewable area "shifting up" does not mean that the display itself slides up. Rather, the viewable area is the focal point that instructs which region of the pitches to display in the lane. In other words, when the viewable area conceptually shifts up, it has the effect of making the note tubes appear to slide downwards, allowing for more room to show higher notes in an upcoming portion. Similarly, when the viewable area shifts down, it has the effect of making the note tubes appear to slide upwards, allowing for more room to show lower notes in an upcoming portion. The shifting and/or the vertical manipulation of note tubes therefore provide a means to alter the viewable area's position based on the portion being displayed or about to be displayed.

In some implementations, the "zoom value," or the deviation between highest and lowest notes is changeable. In FIG. 6B, 628 depicts three portions, 645, 650, 655 with altered zoom values. This allows portion that have a narrow range, e.g., with tubes spread over a small pitch range, e.g., one octave, such as 645 and 655 to easily be displayed with sufficient distance between the note tubes, while at the same time allowing for "zooming out" when it is necessary to display a wider pitch range, e.g., three octaves, such as that of 650. As a reference, the note tubes 657*a*, 657*b*, 657*c* represent the same notes in each portion 645, 650, 655. In portion 650, the note tubes 657*b* appear vertically closer together than the note tubes 657*a* of portion 645 because the pitch density (i.e., zoom value) is higher for portion 650 to allow the greater pitch range of 650 to be displayed.

In some implementations, the game platform 100, via display logic, directs the display 105 to visually zoom in and zoom out when displaying portions of different densities. This is accomplished similar to the steps above with respect to a shiftable display—the song is divided into portions, and the pitch range for each portion is determined. Then the game platform 100 determines a display density for each portion based on the pitch range of that portion. Then the portion is displayed with a pitch density that is alterable based on the displayed portion. For example, transitioning between portion 645 and 650 alters the appearance of the viewable area such that the portion appears to zoom out to show the greater pitch range of 650 (the highest note of 650 could not be displayed in 645 because it is outside the viewable area displayed in 645). Then, because 655 does not have the high pitches that 650 does, the viewable area zooms in and displays a pitch density that corresponds to the highest note and lowest notes of 655. In some implementations, the visual effect of transitioning from 645 to 650 is that the note tubes appear to shrink in the vertical dimension to allow for wider span, or larger number, of note tubes to be displayed in a single lane.

Referring back to FIG. 6A, for example, lane 620 has a particular zoom value, e.g., showing only a pitch range of an octave, whereas lane 600 has a pitch range that shows three octaves. Alternatively, the zoom value can be set based on the deviation between the lowest note of all portions and the highest note of all portions, i.e., the deviation can be determined for the whole song.

Figure 6C:
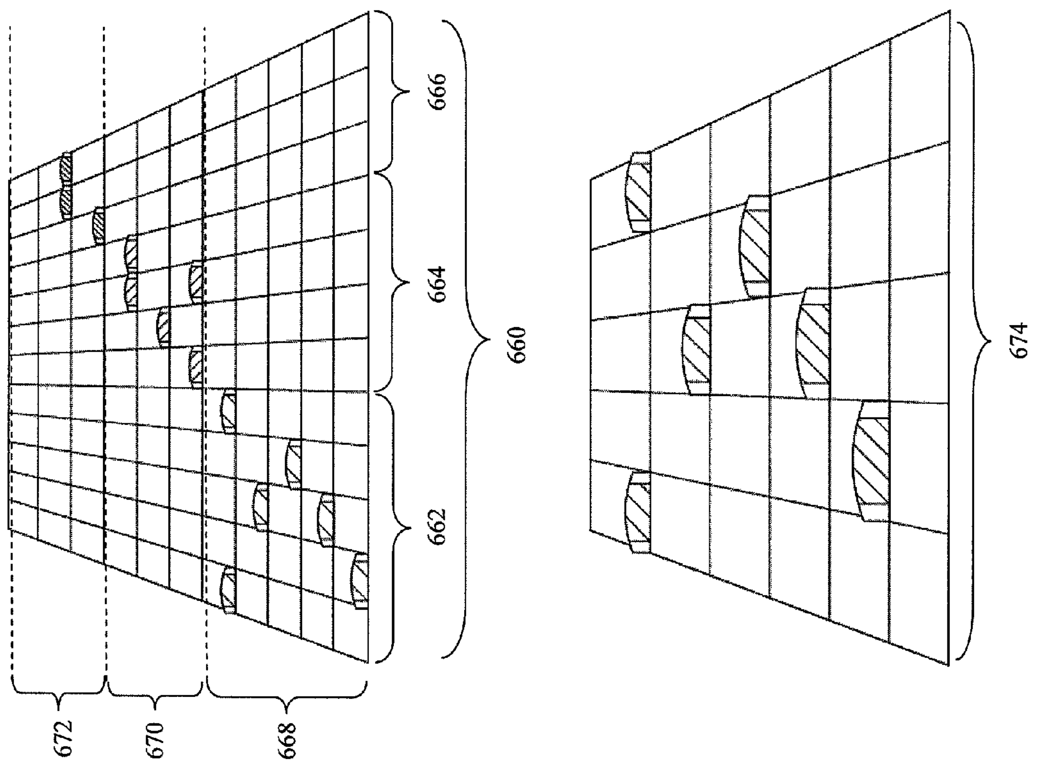
FIGS. 6C and 6D depict embodiments that display dynamic pitch display for instruments.

Beneficially, dynamic pitch range is not limited to vocal parts; some embodiments use dynamic pitch range for instrumental parts such as a keyboard, guitar, or drums as well. FIG. 6C shows another example of dynamic range display as it applies to displaying instrumental target music data. In FIG. 6C, the range of target music data spans twelve sub-lanes 660. For some displays, or in situations with multiple instruments and vocals being displayed on one display, twelve sub-lanes do not fit on the screen. Beneficially, one aspect of the present invention dynamically determines how many sub-lanes to display at once and which sections of the twelve lanes to display at one time, e.g., the low, left-most range 662 of five sub-lanes, middle range 664 of four sub-lanes, or high, right-most range 666 of three sub-lanes, or combinations of these, e.g., the low and middle range or portions of these combined, e.g., the two rightmost lanes of the low range 662 and the three left-most lanes of the middle range 664.

Figure 6D:
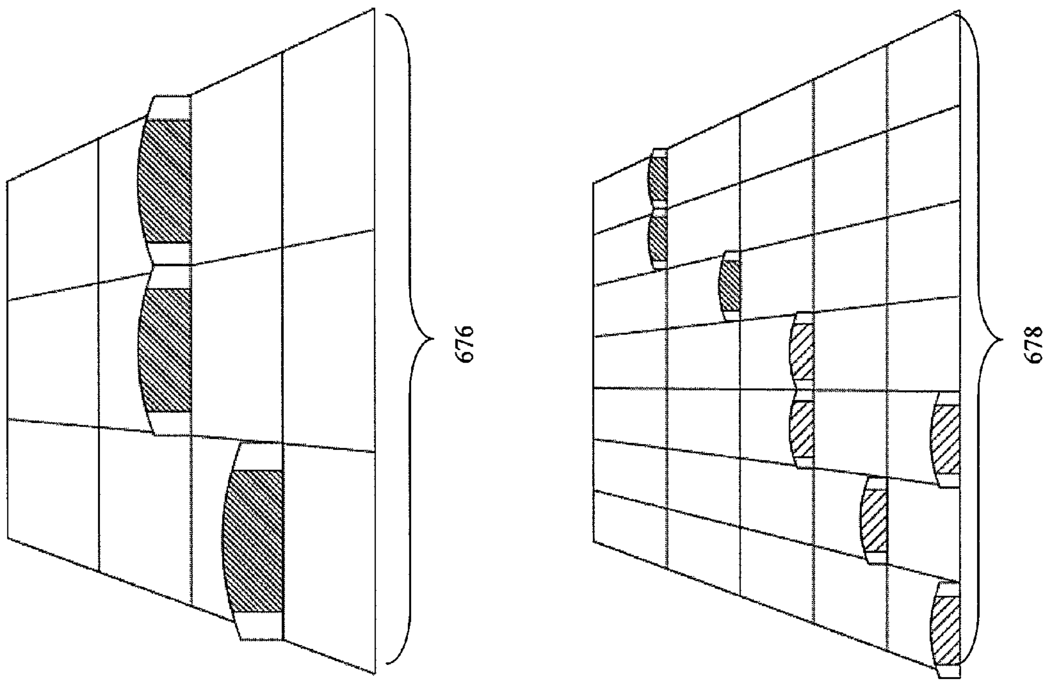

Again, the musical composition is divided into portions 668, 670, 672. Then the game platform 100 determines the pitch range for each portion, and each portion is displayed with the appropriate number of sub-lanes. The amount to zoom in, or in this case, the number of sub-lanes to display, is determined based on the left-most and right-most gems, e.g., five sub-lanes difference in portion 668, four gems difference in portion 670, and three gems difference in portion 672. Additionally or alternatively, the game platform 100 determines a limited area of the total twelve-sub-lane to display, e.g., only the low portion, or only the middle portion, or only the high portion, or combinations of low and middle, middle and high, or other combinations. For portion 668, the game platform 100 determines that only the five sub-lanes of section 662 are required. Therefore, during portion 668, the display window's position is altered such that only 662's sub-lanes are displayed, and a lane similar to 674 is displayed to the player. Then, as gameplay progresses, the game platform determines for portion 670, only the sub-lanes of section 664 need to be displayed and the display window shifts horizontally to the right to display only the sub-lanes of 664. Then, similarly, for portion 672, the display window shifts to the right again and displays only the sub-lanes of section 666, i.e., as shown in 676 of FIG. 6D. It should be noted that in the above example, as the display window shifts to the right, the sub-lanes and gems appear to shift to the left while simultaneously scrolling towards the player.

Beneficially, continuing the above example, not only is the position of the display window altered by moving from left to right as gameplay transitions between portions, but similarly, the zoom value used to display each portion changes. Portion 662 is rendered as a five sub-lane lane 674 in FIG. 6C whereas portion 672 is rendered as a three sub-lane lane 676 in FIG. 6D. The pitch density of the lane, i.e., the number of sub-lanes, dynamically changes with each portion. Furthermore, if portions 670 and 672 combined, such as in implementations where a greater pitch range is allowed per portion, or implementations for a keyboard peripheral where the user can play the game with both hands, the displayed pitch density can account for more than one portion and display a lane to the player such as 678 that combines sub-lanes of different sections, here sections 664 and 666. This is accomplished by determining the highest and lowest notes of adjacent portions and taking the maximum of the highest notes for each portion and the minimum of the lowest notes for each portion and determining the pitch range of the combination based on the maximum high note and the minimum low note.

Figure 7:
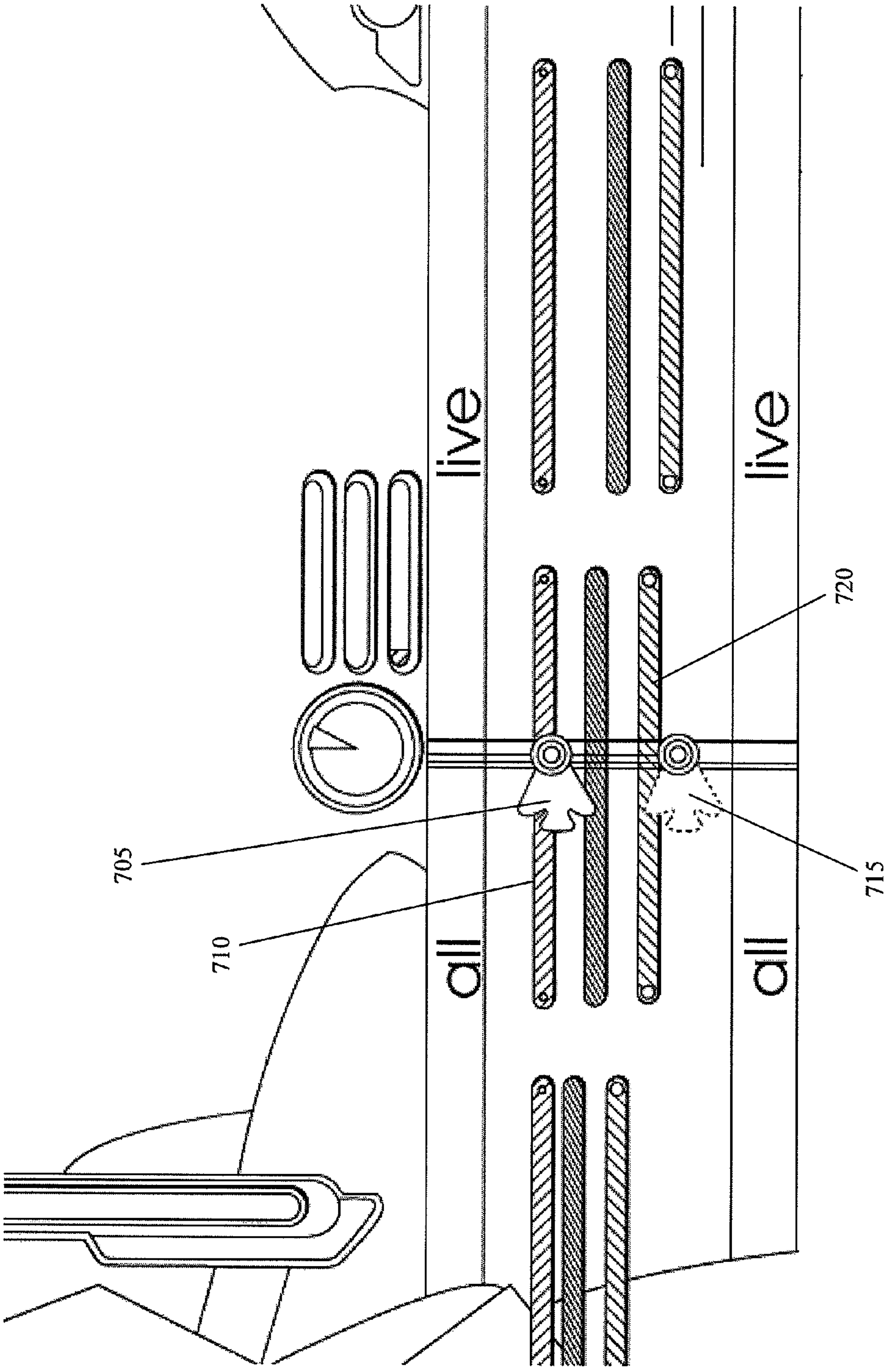
FIG. 7 shows a vocal performance where the player's input is displayed at both the pitch input and the pitch modulo octave to another part.

Referring now to FIG. 7, displayed is a vocal performance where the player's input is displayed at both the pitch input and the pitch modulo octave to another part. Because some implementations are modulo octave, beneficially the present invention can display the player's input with respect to multiple octaves since performing at a modulo octave pitch may be closer to the target music data than the pitch being sung by the player. In implementations where the octave an input is does not matter, it may be ambiguous which part a player is singing. For example, in FIG. 7, the player's input 705 is close to cue 710 of a harmony part. However, if octaves are not considered, the player's input, an octave lower 715 (shown in phantom) is also close to cue 720, which is part of the melody. Displaying the player's input at additional octave ranges allows the player to switch parts mid-phrase without drastically changing their pitch, should that pitch be close to the cues of another part. Additionally, the player's singing may be within the tolerance threshold of multiple parts when octave is not considered and they may be dynamically assigned to and/or scored for either part during the period where it is ambiguous if they are singing 710 or 720.

Displaying multiple arrows is accomplished when the game platform 100 receives music performance data via a microphone. The game platform 100 displays the player's input on the display as pitch marker that is reflective of the music performance input data, e.g., indicates the relative pitch of the performance. Then, the game platform 100 displays, on the display 105, substantially simultaneously with the display of the first pitch marker, a second pitch marker at a vertical offset from the first pitch marker. The offset is indicative of an octave difference between the first pitch marker and the second pitch marker, such as being an octave above the first pitch marker or an octave below the first pitch marker. Alternatively, if the lane is displayed to show multiple octaves, the second pitch marker can be displayed at any octave offset from the first pitch marker.

The singing analysis module 130 of the game platform 100 will, in some embodiments, calculate a score for the first pitch marker based on a comparison between the first pitch marker and the pitch component of the vocal cue. Additionally, the singing analysis module 130 of the game platform 100 calculates a second score for the second pitch marker based on a comparison between the second pitch marker and the pitch component of the vocal cue. Alternatively, the score can be calculated for the second pitch marker if the input has a degree of matching with a different part, e.g., a harmony line an octave below the melody line the player was singing.

Practice Mode for Multiple Musical Parts

Figure 8:
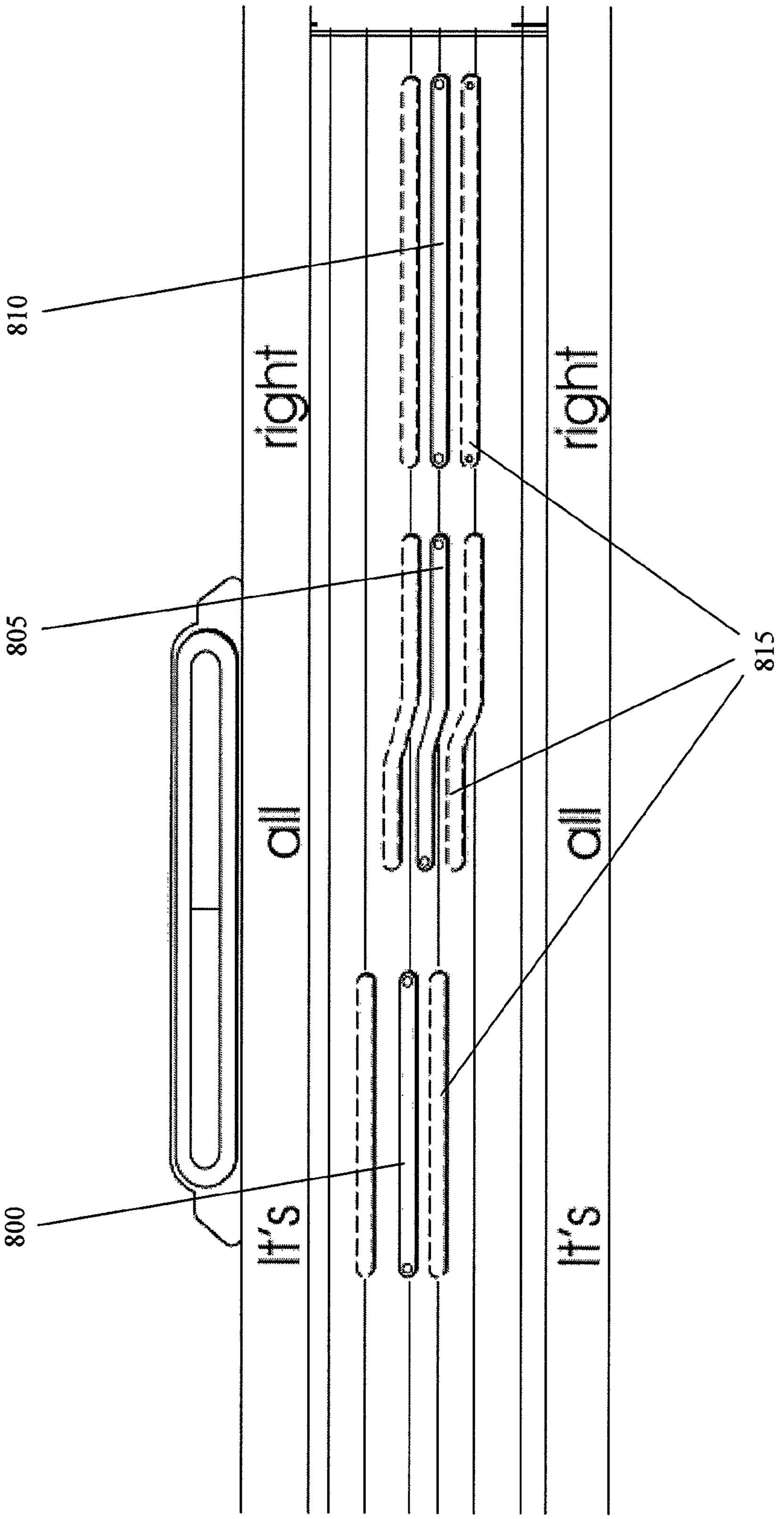
FIG. 8 depicts a practice mode where unselected parts are made less visible and are not scored.

To assist players that wish to sing or perform different parts, a practice mode is provided where multiple parts are displayed, but only one is scored. In FIG. 8, the player has selected to practice a harmony part (cues 800, 805, 810). In certain embodiments, the other parts, e.g., the cues 815, are still displayed, but are dimmed or made less visible (here shown in phantom). In some of these implementations, the dynamic part determination described above is turned off and a player's input is not assigned to any part but the chosen practice part. Further, the player's input will only generate score based on the degree of matching between the input and the note tube of the selected practice part. Additionally, in some versions, an audible tone is played via the sound processing module 135 that matches the pitch of the part being practiced. The tone can be barely audible, as loud as the other music data reproduced by the game platform 100, or louder than other outputs of the game platform 100.

Specifically, the practice mode is enabled by displaying, on the display 105, a note tube or target music data associated with the song or musical composition. The game platform 100 receives via an input interface or menu, or alternatively determined based on the player's performance using dynamic part determination, a particular part the player wants performed, such as the part associated with 800, 805, 810. Then the game platform 100 produces an audio output via the sound processing module 135 associated with the vocal cues, e.g., singing or music for the selected part. Optionally, audible sounds, lyrics, or notes can be played for all parts. Further, the game platform 100 can produce a synthesized tone associated with the selected part that helps the player match their voice to the pitch of the audible tone. As the player practices the part, a score is calculated based on the degree of matching between the player's input and the note tube of the selected part. If a different part is selected for practice, an audible tone for that part is played and the other, non-selected parts are then dimmed (including the first-selected part if it was not chosen again). Allowing the player to practice a section and not be dynamically assigned to a different part improve the player's enjoyment of the game.

Prior art games display scrolling vocal cues and scrolling text. Unfortunately, this can cause blurring of the text on certain displays 105 and or screen "tearing." One aspect of the invention provides an improved way of displaying lyrics and target music data.

Displaying Song Lyrics and Vocal Cues

Figure 9:
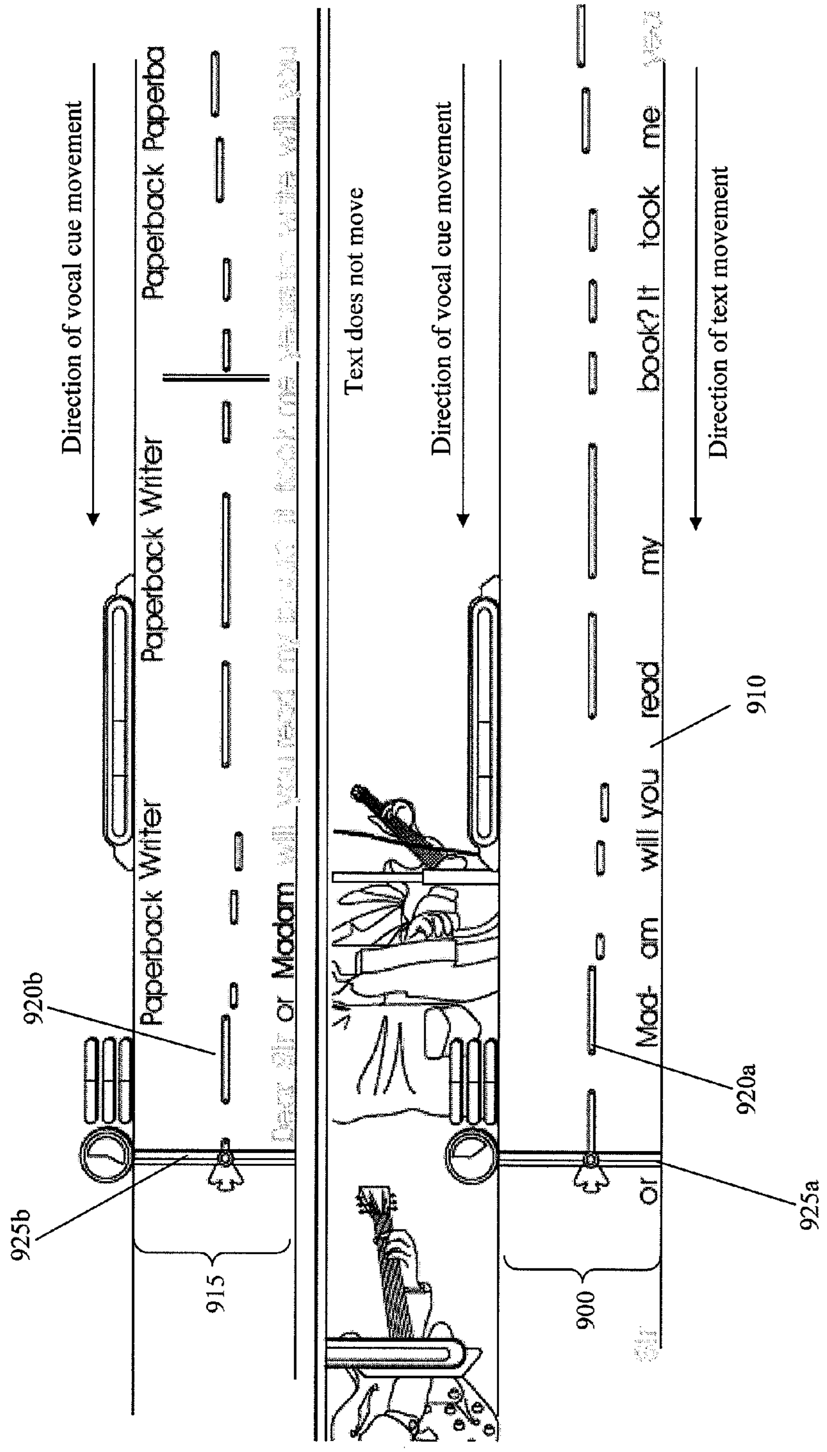
FIG. 9 displays two visual modes for displaying target music data and lyrics in the game.

FIG. 9 displays two visual modes for displaying target music data and lyrics in the game. Lane 900 depicts the display method described above, namely the note tubes 920*a* move (from right to left in this case) towards a Now Bar 925*a* and a first set of lyrics 910 moves towards the Now Bar in time with the cues 920*a*. An improved method is depicted in lane 915. In lane 915, the vocal cues 920*b* still move towards the Now Bar 925*b*, but the text of the lyrics is static—that is, the lyrics do not move horizontally with the vocal cues 920*b*. Instead the lyrics remain fairly stationary while the cues 920*b* move towards the Now Bar 925*b*. As the vocal cue that corresponds to a lyric begins to pass through (or in some cases before it passes through) the vertical plane of the Now Bar 925*b*, the coloration of the text changes such that the player knows what lyric or syllable the singer is supposed to be singing. After the vocal cue for that portion has passed through the Now Bar 925*b*, the coloration changes indicating the user is "done" with that lyric and does not need to sing it.

This is accomplished by the game platform 100 displaying, on the display 105 via display logic, a vocal cue and moving the vocal cue on the display towards a target marker in synchronization with the timing of the song. Then, the game platform 100 displays, on the display 105, a lyric associated with the vocal cue in a fixed position until the vocal cue has moved to a particular position with respect to the target marker such as the over or past the target marker.

Beneficially, a "queued" word also has its color changed so the player knows it is not the lyric the singer is singing now, but it will be the next lyric the singer sings. For example the lyric that should be sung "or" in some versions would be colored green. "Madam", the next lyric or syllable is colored white. Then the remaining lyrics, as well as lyrics already sung, are colored grey. By having the lyrics remain static and have the note tubes still move, this aspect of the invention overcomes the blurring and tearing of the lyric text experienced on some displays with prior art vocal games.

Selectively Displaying Song Lyrics

Figure 10:
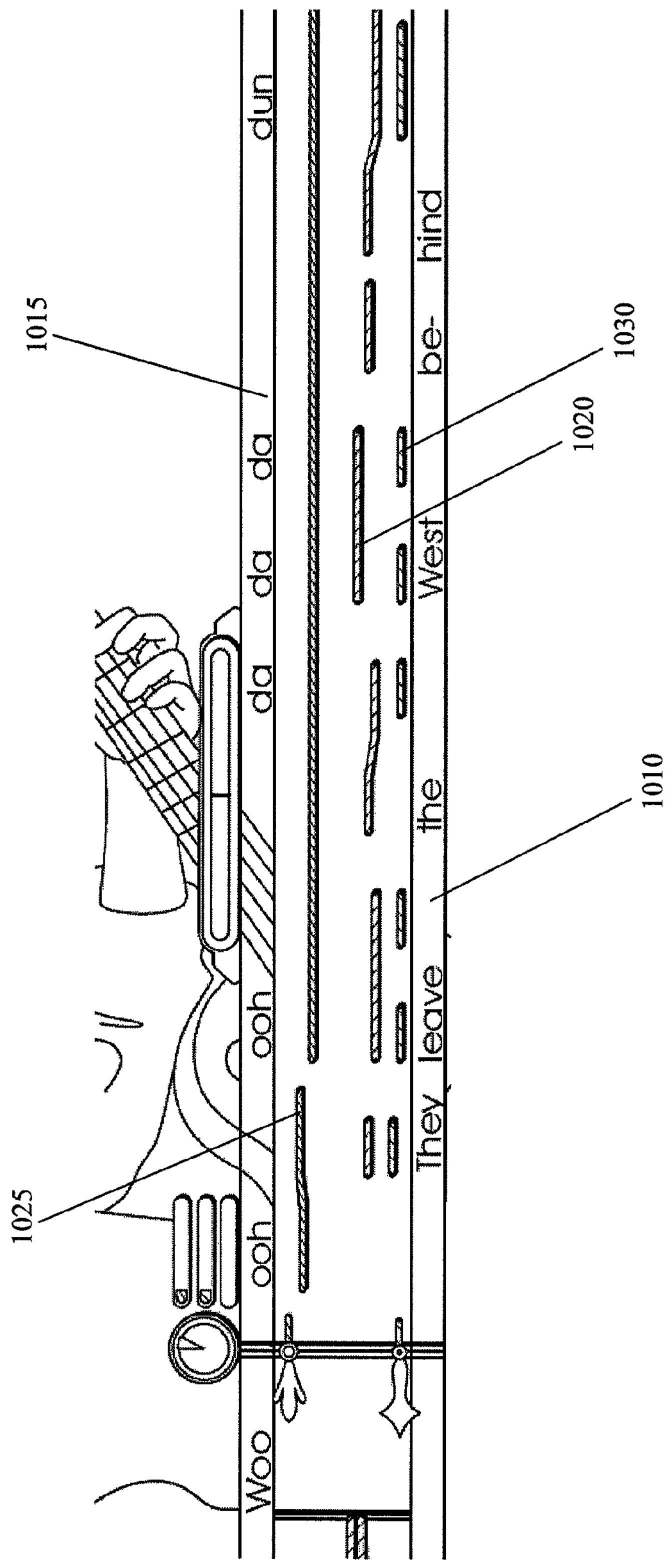
FIG. 10 depicts determining which lyrics to display when there are more vocal cues displayed than there is space available for the vocal cue's associated lyrics.

In one aspect of the invention, a way of determining which lyrics to display to players in a multi-vocal-part game is provided. In FIG. 10, two sets of lyrics are displayed: lyrics 1010 associated with the melody part or "main line" and lyrics 1015 associated with the harmony part. There are, however, three sets of vocal cues, i.e., cues 1020 associated with the melody, cues 1025 associated with a first harmony portion and cues 1030 associated with a second harmony portion. The two harmony lines 1025, 1030 can have different pitches, but only one set of lyrics between the two can be displayed.

Advantageously, each set of lyrics is assigned a priority by the game platform 100. Typically the two lyric lines with the highest priorities are displayed, although in some implementations the priority is determined randomly at run-time. In some embodiments, the priority is assigned to each lyric line by the game developer, while in others, it can be chosen by the players before gameplay begins or during gameplay.

Determining which lyrics to display begins by the game platform 100 determining how many vocal cues will need to be displayed. Then, based either on limitations provided by the game developer before the game is executed or determined at run-time, the game platform 100 determines the number of areas available to display lyrics. When the number of spaces to display lyrics is less than the number of vocal cues (or correspondingly the number of vocal cues is greater than the available spaces) the game platform 100 determines which lyrics have the highest priority and displays the lyrics, one set per display area, in priority order until the number available spaces have been exhausted.

In FIG. 10, the vocal cue 1020 is associated with a part such as the melody and the lyric 1010 is associated with the vocal cue 1020. A second vocal cue 1025 and third vocal cue 1030 are displayed, each corresponding to a second and a third part in the song such as two respective harmony parts. Each lyric or set of lyrics is examined to determine the priority associated with each lyric or set of lyrics (though this determination can also be made before displaying the second and third cues, or even before the cues for the melody are displayed). As explained above, the lyrics (or set of lyrics) with the highest priority are displayed. In some implementations, where different parts are designated as melody and harmony parts, the melody lyrics are always displayed and priority determinations are only made with respect to the harmony parts. The game developer can also assign a predetermined priority to a certain part's lyrics on a per-song basis, e.g., the first harmony part's lyrics have a higher priority for "She's got a ticket to ride" whereas the second harmony part's lyrics have a higher priority for "Here comes the sun." The game developer can also assign priorities such that the lyrics of one of the parts are always displayed irrespective of song, e.g., the first harmony part's lyrics are always displayed. In other embodiments, the player can select via a menu to always display a certain part's lyrics, e.g., the lyrics for the first harmony part. Additionally, in some versions, the player can actively decide to display a different set of lyrics during gameplay by selecting a different set of lyrics via a menu. This can be done by overriding the priority determination or, alternatively, by assigning the chosen lyrics the highest priority and performing the priority determination again.

In some embodiments, a lyric's priority can be determined randomly at run time if multiple sets of lyrics have the same priority assigned to them by the developer. Beneficially this adds to the player's enjoyment because different lyrics are displayed for each session and later gameplay sessions are not performed exactly like prior gameplay sessions. In some embodiments, the priority determination is done at the beginning of a song, while in others the determination is made on a per-phrase or per-bar basis. Notably, the parts associated with each set of lyrics do not need to be designated as the melody part and two harmony parts. In some embodiments there are three or more harmony parts with no melody parts. In other embodiments there are three or more parts that are not designated as a melody or harmony and instead are just considered different parts. Other combinations, e.g., two melodies and one harmony and the like are also contemplated Preventing an Unintentional Deploy of A Bonus As described earlier, either vocally or with an instrument, a deployable bonus can become available (see bonus meter 245 in FIG. 2) to the player. In some vocal implementations, a bonus is "deployed" when an input is received that is of a certain volume and for a certain duration, e.g., by singing or screaming or rapping or growling when no lyrics or note tubes are presented to the player. If a player attempts to deploy the bonus, the input from the player is added as "energy" to a "meter" (not displayed to the player) and if the meter fills within a certain timeframe, the bonus is deployed. Forcing the player to provide an input at a certain volume and/or for a certain duration, and therefore fill the internal meter, prevents accidental deploys caused by background noise or accidental input by the player. However, in systems where multiple players are providing input and microphones are not tied to particular parts, a person attempting to sing a vocal part may accidentally trigger a deployable bonus, which is undesirable. To solve this problem, players can at times be prevented from deploying a bonus.

Figure 11:
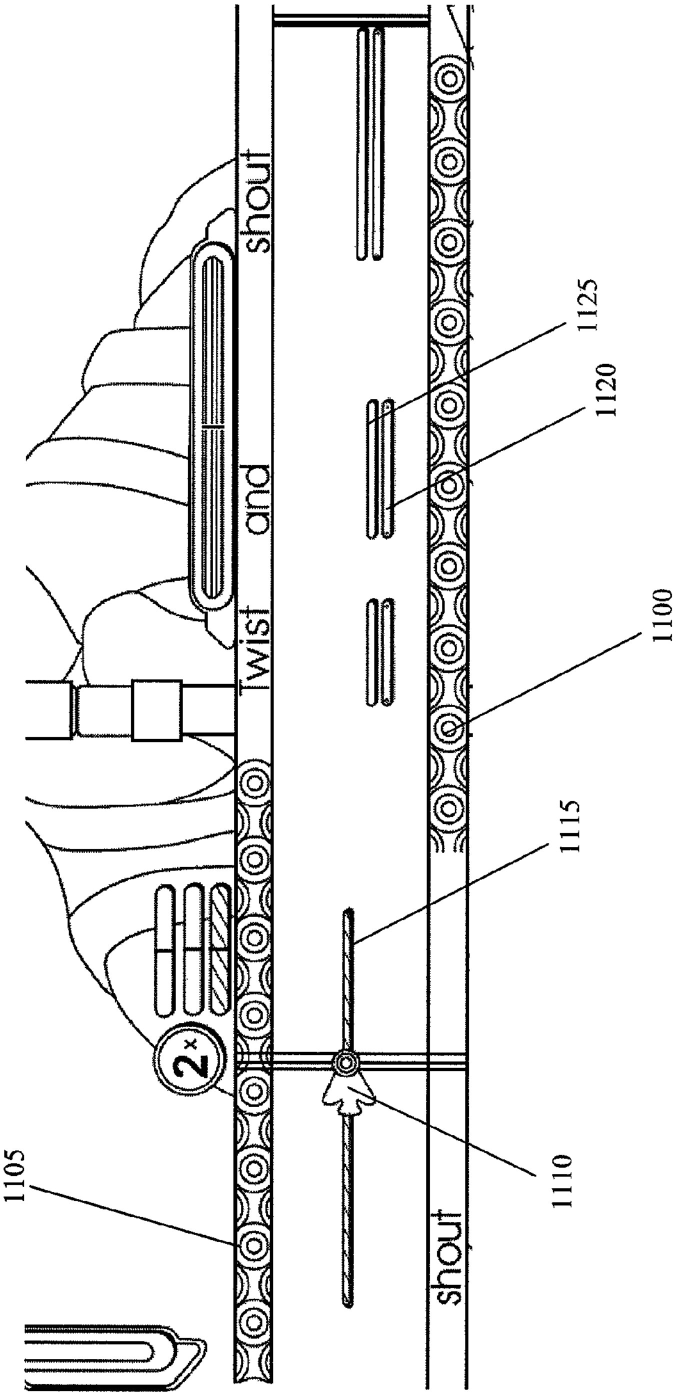
FIG. 11 depicts a screenshot of a scenario where a deployable bonus is available at different times to the person singing lead vocals and to the person singing melody vocals.

FIG. 11 depicts a screenshot of a scenario where a deployable bonus is available at different times 1100, 1105 to the person singing lead vocals and to the person singing melody vocals. Again, because microphones are not tied to a part, the deployable bonus is really available in either time frame to anyone that wants to activate it. For example, during deploy period 1100, in prior art systems someone singing "twist and shout" at a certain volume for a certain duration would trigger the bonus. Such an outcome is undesirable because the player's intent is to sing a part of a song, not to deploy a bonus. With the current invention, if the player signing into a microphone is determined to be successfully singing an available part because their input has a degree of matching with any given part, they will be prevented from deploying a bonus.

Continuing the example, during deploy period 1105, the player is singing "shout" successfully and therefore the player's input 1110 has a degree of matching with vocal cue 1115. As explained above, the degree of matching can be a measure of how close the input pitch 1110 is to the vocal cue 1115, or the input pitch 1110 can simply be within the tolerance threshold (not displayed) of the vocal cue 1115, or a combination of these depending on the implementation. When the singing analysis module 130 of the game platform 100 determines, e.g., via the singing analysis module 130, that because an input has a degree of matching with a part being displayed, then the game platform prevents that input from satisfying the bonus deploy criteria (certain-volume-for-a-certain-time criteria) and effectively blocks that input from triggering the bonus deploy (in some embodiments, it accomplishes this by not counting the volume or duration of the input towards the internal meter that determines if the volume or duration of an input satisfies the triggering criteria). Then, because the melody part 1115 does not have a vocal cue or lyrics to be sung, the bonus can be deployed during the melody parts' period of silence (indicated at deploy period 1100). During 1100, if any player, including the person that just sung the melody, sings either the harmony part 1120, 1125 successfully, that person is also prevented from deploying the bonus. However, if the person provides input that is above a certain volume for a certain period, and that input does not have a degree of matching with either cue/part 1120, 1125, then the bonus will be deployed.

The above-described techniques can be implemented in digital electronic circuitry, or in computer hardware, firmware, software, or in combinations of them. The implementation can be as a computer program product, i.e., a computer program tangibly embodied in a machine-readable storage device, for execution by, or to control the operation of, data processing apparatus, e.g., a programmable processor, a computer, a game console, or multiple computers or game consoles. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or game console or on multiple computers or game consoles at one site or distributed across multiple sites and interconnected by a communication network.

Method steps can be performed by one or more programmable processors executing a computer or game program to perform functions of the invention by operating on input data and generating output. Method steps can also be performed by, and apparatus can be implemented as a game platform such as a dedicated game console, e.g., PLAYSTATION® 2, PLAYSTATION® 3, or PSP® manufactured by Sony Corporation; WII™, NINTENDO DS®, NINTENDO DSi™, or NINTENDO DS LITE™ manufactured by Nintendo Corp.; or XBOX® or XBOX 360® manufactured by Microsoft Corp. or special purpose logic circuitry, e.g., an FPGA (field programmable gate array) or an ASIC (application-specific integrated circuit) or other specialized circuit. Modules can refer to portions of the computer or game program and/or the processor/special circuitry that implements that functionality.

Processors suitable for the execution of a computer program include, by way of example, both general and special purpose microprocessors, and any one or more processors of any kind of digital computer or game console. Generally, a processor receives instructions and data from a read-only memory or a random access memory or both. The essential elements of a computer or game console are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer or game console having a display device, e.g., a CRT (cathode ray tube) or LCD (liquid crystal display) monitor, a television, or an integrated display, e.g., the display of a PSP® or Nintendo DS. The display can in some instances also be an input device such as a touch screen. Other typical inputs include simulated instruments, microphones, or game controllers. Alternatively input can be provided by a keyboard and a pointing device, e.g., a mouse or a trackball, by which the user can provide input to the computer or game console. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer or game console having a graphical user interface through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing/gaming system can include clients and servers or hosts. A client and server (or host) are generally remote from each other and typically interact through a communication network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. A method executed on a game platform in signal communication with a display and an input device, the method comprising:

(a) displaying, on the display, a first target music data and a second target music data associated with a musical composition, the first target music data having a tolerance threshold that overlaps with a tolerance threshold of the second target music data;

(b) receiving a music performance input data via the input device;

(c) determining that the music performance input data is within the first target music data tolerance threshold and within the second target music data tolerance threshold;

(d) determining a first score based on a first degree of matching between the music performance input and the first target music data;

(e) determining a second score based on a second degree of matching between the music performance input and the second target music data; and (f) assigning the music performance input data to the first target music data or the second target music data when the difference between the first score and second score is greater than a predetermined value.

2. The method of claim 1 wherein the music performance input data is assigned to the part associated with the higher score.

3. The method of claim 1 wherein the first and second degrees of matching are determined by comparing a pitch component of the music performance input data to a pitch component of the respective first and second target music data.

4. The method of claim 1 further comprising associating a pitch arrow with the music performance input.

5. The method of claim 4 wherein the pitch arrow points up if the music performance input data is flat compared to the assigned target music data and the pitch arrow points down if the music performance input data is sharp as compared to the assigned target music data.

6. The method of claim 1 further comprising, before step (f), displaying the first score on the display.

7. The method of claim 6 wherein after step (f), if the assigned score is the second score, ceasing to display the first score and instead displaying the second score on the display.

8. The method of claim 1 wherein assigning the music performance input data to either the first or second target music data alters a visual property of the assigned target music data.

9. The method of claim 8 wherein the assigned target music data glows or flashes.

10. A computer program product, tangibly embodied in a computer-readable storage medium, the computer program product including instructions operable to cause a data processing apparatus to:

display, on a display in signal communication with the data processing apparatus, a first target music data and a second target music data associated with a musical composition, the first target music data having a tolerance threshold that overlaps with a tolerance threshold of the second target music data;

receive a music performance input data via an input device in signal communication with the data processing apparatus;

determine that the music performance input data is within the first target music data tolerance threshold and within the second target music data tolerance threshold;

determine a first score based on a degree of matching with the first target music data;

determine a second score based on a degree of matching with the second target music data; and assign the music performance input data to the first target music data or the second target music data when the difference between the first score and second score is greater than a predetermined value.

11. A system comprising:

a data processing apparatus configured to:

display, on a display in signal communication with the data processing apparatus, a first target music data and a second target music data associated with a musical composition, the first target music data having a tolerance threshold that overlaps with a tolerance threshold of the second target music data;

receive a music performance input data via an input device in signal communication with the data processing apparatus;

determine that the music performance input data is within the first target music data tolerance threshold and within the second target music data tolerance threshold;

determine a first score based on a degree of matching with the first target music data;

determine a second score based on a degree of matching with the second target music data; and assign the music performance input data to the first target music data or the second target music data when the difference between the first score and second score is greater than a predetermined value.

12. An apparatus comprising:

means for displaying, on a display in signal communication with the apparatus, a first target music data and a second target music data associated with a musical composition, the first target music data having a tolerance threshold that overlaps with a tolerance threshold of the second target music data;

means for receiving a music performance input data via an input device in signal communication with the apparatus;

means for determining that the music performance input data is within the first target music data tolerance threshold and within the second target music data tolerance threshold;

means for determining a first score based on a degree of matching with the first target music data;

means for determining a second score based on a degree of matching with the second target music data; and means for assigning the music performance input data to the first target music data or the second target music data when the difference between the first score and second score is greater than a predetermined value.

13. A method executed on a game platform in signal communication with a display and an input device, the method comprising:

(a) displaying, on the display, at least a first target music data and a second target music data associated with a musical composition, the first target music data having a tolerance threshold that overlaps a tolerance threshold of the second target music data;

(b) receiving, by the game platform, a music performance input data via the input device;

(c) determining, by the game platform, that the music performance input data is within the first target music data tolerance threshold and within the second target music data tolerance threshold;

(d) assigning, by the game platform, the music performance input data to the first target music data when the first target music data tolerance threshold and the second target music data tolerance threshold no longer overlap.

14. The method of claim 13 further comprising:

(e) assigning, by the game platform, a score based on a degree of matching between the music performance input data and the first target music data.

15. A computer program product, tangibly embodied in a computer-readable storage medium, the computer program product including instructions operable to cause a data processing apparatus to:

display, on a display in signal communication with the data processing apparatus, at least a first target music data and a second target music data associated with a musical composition, the first target music data having a tolerance threshold that overlaps a tolerance threshold of the second target music data;

receive a music performance input data via an input device in signal communication with the data processing apparatus;

determine that the music performance input data is within the first target music data tolerance threshold and within the second target music data tolerance threshold;

assign the music performance input data to the first target music data when the first target music data tolerance threshold and the second target music data tolerance threshold no longer overlap.

16. A system comprising:

a data processing apparatus configured to:

display, on a display in signal communication with the data processing apparatus, at least a first target music data and a second target music data associated with a musical composition, the first target music data having a tolerance threshold that overlaps a tolerance threshold of the second target music data;

receive a music performance input data via an input device in signal communication with the data processing apparatus;

determine that the music performance input data is within the first target music data tolerance threshold and within the second target music data tolerance threshold;

assign the music performance input data to the first target music data when the first target music data tolerance threshold and the second target music data tolerance threshold no longer overlap.

17. An apparatus comprising:

means for displaying, on a display in signal communication with the apparatus, at least a first target music data and a second target music data associated with a musical composition, the first target music data having a tolerance threshold that overlaps a tolerance threshold of the second target music data;

means for receiving a music performance input data via an input device in signal communication with the apparatus;

means for determining that the music performance input data is within the first target music data tolerance threshold and within the second target music data tolerance threshold;

means for assigning the music performance input data to the first target music data when the first target music data tolerance threshold and the second target music data tolerance threshold no longer overlap.

* * * * *